US010667279B2

(12) United States Patent
Niina

(10) Patent No.: US 10,667,279 B2
(45) Date of Patent: May 26, 2020

(54) INFORMATION PROCESSING DEVICE, INFORMATION PROCESSING METHOD, AND PROGRAM

(71) Applicant: KDDI CORPORATION, Tokyo (JP)

(72) Inventor: Tsuyoshi Niina, Tokyo (JP)

(73) Assignee: KDDI CORPORATION, Tokyo (JP)

(*) Notice: Subject to any disclaimer, the term of this patent is extended or adjusted under 35 U.S.C. 154(b) by 131 days.

(21) Appl. No.: 15/754,868

(22) PCT Filed: Dec. 26, 2016

(86) PCT No.: PCT/JP2016/088676
§ 371 (c)(1),
(2) Date: Feb. 23, 2018

(87) PCT Pub. No.: WO2017/115747
PCT Pub. Date: Jul. 6, 2017

(65) Prior Publication Data
US 2018/0302907 A1    Oct. 18, 2018

(30) Foreign Application Priority Data

Dec. 28, 2015  (JP) .................................. 2015-256930
Jan. 8, 2016   (JP) .................................. 2016-002941
(Continued)

(51) Int. Cl.
*H04W 64/00*    (2009.01)
*H04W 72/10*    (2009.01)
(Continued)

(52) U.S. Cl.
CPC .............. *H04W 72/10* (2013.01); *H04B 7/15* (2013.01); *H04M 3/00* (2013.01); *H04W 28/02* (2013.01);
(Continued)

(58) Field of Classification Search
None
See application file for complete search history.

(56) References Cited

U.S. PATENT DOCUMENTS 8,130,655 B2    3/2012  Foottit et al.
9,210,102 B1 *  12/2015  Wise ..................... H04L 47/826
(Continued)

FOREIGN PATENT DOCUMENTS

EP    2 512 176 A1    10/2012
JP    2000-013371 A    1/2000
(Continued)

OTHER PUBLICATIONS

Office Action issued in Japanese family member Patent Application No. 2016-053088 dated Jul. 23, 2019, together with an English translation thereof.
(Continued)

*Primary Examiner* — Ayanah S George
(74) *Attorney, Agent, or Firm* — Greenblum & Bernstein, P.L.C.

(57) ABSTRACT

This information processing device includes an acquisition unit configured to acquire communication data, a priority determination unit configured to determine a priority for identifying a priority ranking in communication bandwidth allocation on the basis of the communication data, a preferential control information generation unit configured to generate preferential control information on the basis of a determination result of the priority determination unit, and a transmission unit configured to transmit device identification information for identifying a device which performs communication and the preferential control information to a communication device which relays communication.

21 Claims, 6 Drawing Sheets

(30) Foreign Application Priority Data

| | | |
|---|---|---|
| Jan. 15, 2016 | (JP) | 2016-006393 |
| Jan. 22, 2016 | (JP) | 2016-010752 |
| Mar. 16, 2016 | (JP) | 2016-053088 |

(51) Int. Cl.
- *H04W 88/18* (2009.01)
- *H04M 3/00* (2006.01)
- *H04W 28/02* (2009.01)
- *H04B 7/15* (2006.01)
- *H04W 72/04* (2009.01)

(52) U.S. Cl.
CPC ....... *H04W 72/0406* (2013.01); *H04W 88/18* (2013.01)

(56) References Cited

U.S. PATENT DOCUMENTS

| | | |
|---|---|---|
| 2012/0052866 A1 | 3/2012 | Froehlich et al. |
| 2012/0195196 A1 | 8/2012 | Chai et al. |
| 2012/0257499 A1* | 10/2012 | Chatterjee ......... H04W 28/0284 370/232 |
| 2013/0059527 A1 | 3/2013 | Hasesaka et al. |
| 2013/0242733 A1 | 9/2013 | Guo et al. |
| 2016/0119844 A1 | 4/2016 | Uchino et al. |
| 2016/0212654 A1 | 7/2016 | Itoh et al. |

FOREIGN PATENT DOCUMENTS

| | | |
|---|---|---|
| JP | 2002-247243 A | 8/2002 |
| JP | 2005-078504 A | 3/2005 |
| JP | 2006-293704 A | 10/2006 |
| JP | 2010-011068 A | 1/2010 |
| JP | 2011-130252 A | 6/2011 |
| JP | 2014-502098 A | 1/2014 |
| JP | 2014-033356 A | 2/2014 |
| JP | 2014-236354 A | 12/2014 |
| JP | 2015-156568 A | 8/2015 |
| JP | 2015-179360 A | 10/2015 |
| JP | 2015-537408 A | 12/2015 |
| JP | 2016-000063 A | 1/2016 |
| WO | 2006/025390 A1 | 3/2006 |
| WO | 2011/027464 A1 | 3/2011 |
| WO | WO 2014/052044 A2 | 4/2014 |
| WO | WO 2015/033580 A1 | 3/2015 |
| WO | 2015/153589 A1 | 10/2015 |

OTHER PUBLICATIONS

Office Action issued in Japan family member Patent Appl. No. 2016-053088, dated Dec. 18, 2018, along with an English translation thereof.

"3rd Generation Partnership Project; Technical Specification Group Services and System Aspects; Policy and charging control architecture (Release 13)", 3GPP TS 23.203 V13.6.0 (Dec. 2015), Dec. 15, 2015, pp. 74-76.

International Search Report issued in WIPO Patent Application No. PCT/JP2016/088676, dated Mar. 14, 2017.

Office Action issued in Japanese family member Patent Appl. No. dated Mar. 5, 2019, dated 2016-010752, along with an English translation thereof.

Office Action issued in Japanese family member Patent Appl. No. dated Mar. 5, 2019, dated 2016-006393, along with an English translation thereof.

Notice of Allowance issued in Japanese family member Patent Appl. No. dated Mar. 5, 2019, dated 2015-256930, along with an English translation thereof.

Office Action issued in Japan family member Patent Appl. No. 2015-256930, dated Nov. 13, 2018, along with an English translation thereof.

Office Action issued in Japan family member Patent Appl. No. 2016-006393, dated Nov. 13, 2018, along with an English translation thereof.

Office Action issued in Japan family member Patent Appl. No. 2016-002941, dated May 7, 2019, along with an English translation thereof.

Official Communication issued in European Patent Office (EPO) Patent Application No. 16881722.9, dated Jun. 6, 2019.

Office Action issued in Japan family member Patent Appl. No. 2019-071590, dated Feb. 12, 2020, along with an English translation thereof.

Decision for Dismissal of Amendment issued in Japan family member Patent Appl. No. 2016-053088, dated Feb. 25, 2020, along with an English translation thereof.

* cited by examiner

FIG. 7

| PRIVILEGE PATTERN | SPECIFIC TERMINAL? | HAS APPLICATION TARGET BEEN USED? | IS WEB ACCESS DESTINATION (SPECIFIC URL) TARGET? | THERE IS TRANSACTION WITH ACCESS DESTINATION/IS AMOUNT OF MONEY OF TRANSACTION GREATER THAN OR EQUAL TO PREDETERMINED AMOUNT? | SPECIFIC TIME PERIOD/ IS NUMBER OF PACKETS OF SPECIFIC TIME PERIOD GREATER THAN OR EQUAL TO PREDETERMINED NUMBER? | DEGREE OF COMMUNICATION CONGESTION/ DEGREE OF PACKET LOSS/ PRESENCE OR ABSENCE OF FAILURE | CHARGING DESTINATION OF COMMUNICATION FEE/DISCOUNT FEE OR BURDEN DESTINATION OF PRIVILEGE |
|---|---|---|---|---|---|---|---|
| 1 | | ○ | | | | | CP |
| 2 | | | ○ | | | | CP |
| 3 | | | | ○ | | | CP |
| 4 | | | | | ○ | | CP |
| 5 | | | | | ○ | ○ | CP |
| 6 | ○ | | | | | | |
| 7 | ○ | | ○ | | | ○ | CP |

US 10,667,279 B2

INFORMATION PROCESSING DEVICE, INFORMATION PROCESSING METHOD, AND PROGRAM

TECHNICAL FIELD

The present invention relates to an information processing device, an information processing method, and a program.

Priority is claimed on Japanese Patent Application No. 2015-256930 filed on Dec. 28, 2015, Japanese Patent Application No. 2016-002941 filed on Jan. 8, 2016, Japanese Patent Application No. 2016-006393 filed on Jan. 15, 2016, Japanese Patent Application No. 2016-010752 filed on Jan. 22, 2016, and Japanese Patent Application No. 2016-053088 filed on Mar. 16, 2016, the contents of which are incorporated herein by reference.

BACKGROUND ART

Demand for data communication services may increase according to a time period or a place. For example, the demand for data communication services will increase within a train in a commuting time period, at a time when an event is held in an event venue, at a time of a disaster, in a residential area at night, or the like. When the demand for data communication services increases, congestion may occur, communication may tend to be interrupted, communication data may be lost on the way, or communication may be temporarily disabled.

A bandwidth reservation device described in Patent Document 1 can provide a data communication service according to a reservation by pre-receiving the reservation of use of a communication bandwidth in a mobile communication system in accordance with reservation information transmitted from a communication terminal operated by a user.

DOCUMENTS OF THE PRIOR ART

Patent Document

[Patent Document 1]
 Japanese Unexamined Patent Application, First Publication No. 2015-156568

SUMMARY OF INVENTION

Problems to be Solved by the Invention

However, demand for communication services does not necessarily occur in a case in which reservations can be made in advance. For example, it is difficult to forecast demand in an event of a disaster or the like in advance. Also, demand for a service for preferentially performing communication with a specific communication terminal (hereinafter also referred to as "preferential communication") as provided by a bandwidth reservation device described in Patent Document 1 does not necessarily occur only from a user who operates a communication terminal. For example, a service provider for providing a communication service may preferentially perform communication with respect to a communication connection that satisfies specific conditions.

Also, even if a service for preferentially communicating with a specific communication terminal (hereinafter also referred to as "preferential communication") as described in Patent Document 1 is provided, it is not possible to avoid all of communication disconnection, communication data loss, temporary communication failure, and the like. It is preferable that such deterioration of communication quality such as communication disconnection, communication data loss, or temporary communication failure should not occur. For example, if a content provider provides a service to a user via communication, it is preferable that the communication quality of communication between the user and the content provider should not deteriorate from the viewpoint of giving the user a motivation to communicate with a content provider.

On the other hand, even if the communication quality or the like deteriorates, it may be possible to give the user a motivation to communicate with the content provider if there is some privilege for the user communicating with the content provider.

The present invention has been made in view of the above circumstances, and an objective of the invention is to provide an information processing device, an information processing method, and a program capable of flexibly performing preferential communication in various situations.

Means for Solving the Problems (1) The present invention has been made to achieve the above-described objective. According to an aspect of the present invention, an information processing device includes an acquisition unit configured to acquire communication data; a priority determination unit configured to determine a priority for identifying a priority ranking in communication bandwidth allocation on the basis of the communication data; a preferential control information generation unit configured to generate preferential control information on the basis of a determination result of the priority determination unit; and a transmission unit configured to transmit device identification information for identifying a device which performs communication and the preferential control information to a communication device which relays the communication.

(2) Also according to an aspect of the present invention, the information processing device according to (1) includes a detection unit configured to detect a communication situation in the communication device, wherein, if a communication connection request indicated by the communication data satisfies a predetermined first condition, the priority determination unit determines the priority for identifying the priority ranking in the communication bandwidth allocation on the basis of the communication data, and wherein, if the communication situation satisfies a predetermined second condition, the transmission unit transmits priority change information indicating a change from the priority to a different priority or preferential disconnection information indicating a disconnection of a preferential connection to the communication device.

(3) Also, according to an aspect of the present invention, in the information processing device according to (1), if a communication connection request indicated by the communication data satisfies a predetermined first condition, the priority determination unit determines the priority for identifying the priority ranking in the communication bandwidth allocation on the basis of the communication data, and, if a predetermined second condition is satisfied, the transmission unit transmits information indicating the device identification information, communication destination identification information for identifying a device of a communication destination of the communication performed by a device identified by the device identification information, preferential control related information which is information related to preferential control to be performed for the communication on the basis of the preferential control information, and communication related information which is information related to the communication to a charging device configured to perform a charging process on the basis of the information.

(4) Also, according to an aspect of the present invention, in the information processing device according to (1), the communication data includes information for requesting a preferential connection and priority information indicating the priority ranking in the communication bandwidth allocation or the priority.

(5) Also, according to an aspect of the present invention, in the information processing device according to (4), the priority information indicates the priority ranking or the priority with respect to a communication connection source in the communication or a communication connection destination in the communication.

(6) Also, according to an aspect of the present invention, in the information processing device according to (1), the communication data is data transmitted by a device of a request source or a request destination of the communication.

(7) Also, according to an aspect of the present invention, in the information processing device according to (1), the communication data is information to be transmitted on the basis of an operation input in the device.

(8) Also, according to an aspect of the present invention, in the information processing device according to (1), the communication data includes identification information for identifying an application, identification information for identifying a communication connection destination, or information indicating a configuration of an IP address associated with the communication connection destination.

(9) Also, according to an aspect of the present invention, in the information processing device according to (1), the priority determination unit makes a determination on the basis of the fact that the communication data has been transmitted or received in a predetermined time period, that the communication data has been transmitted from a device located in a predetermined place, or that the communication data is a predetermined type of communication data.

(10) Also, according to an aspect of the present invention, the information processing device according to (1) includes a detection unit configured to detect a communication situation of the communication, wherein the priority determination unit determines whether or not to perform preferential control on the basis of the communication situation.

(11) Also, according to an aspect of the present invention, in the information processing device according to (1), if the number of devices connected to the communication device in a first priority exceeds a predetermined number or if a proportion of the communication bandwidth in use exceeds a predetermined proportion, the priority of any one of the devices connected to the communication device that is the device meeting a predetermined condition is changed to a second priority different from the first priority.

(12) Also, according to an aspect of the present invention, in the information processing device according to (1), the priority determination unit may start a determination of the priority on the basis of communication data indicating a start request of communication in the priority.

(13) Also, according to an aspect of the present invention, in the information processing device according to (2), the detection unit detects the communication situation in one or more communication devices, and the transmission unit performs transmission to one or more communication devices.

(14) Also, according to an aspect of the present invention, in the information processing device according to (2), the predetermined second condition is that a usage proportion of the communication bandwidth in the communication device in which the communication is performed exceeds a predetermined threshold value.

(15) Also, according to an aspect of the present invention, in the information processing device according to (2), the predetermined second condition is that the number of simultaneous connections in the communication exceeds a predetermined threshold value.

(16) Also, according to an aspect of the present invention, in the information processing device according to (2), the predetermined second condition is that the communication is communication in a predetermined time period or that a communication area of the communication device is a predetermined communication area.

(17) Also, according to an aspect of the present invention, in the information processing device according to (2), the predetermined second condition is that an average throughput of the device connected to the communication device in which the communication is performed is less than a predetermined threshold value.

(18) Also, according to an aspect of the present invention, in the information processing device according to (3), the communication related information is information indicating at least one of a communication start clock time, a communication end clock time, information indicating a position where communication has occurred, the number of communication packets, an amount of communication data, a throughput, and a communication time.

(19) Also, according to an aspect of the present invention, in the information processing device according to (3) or (18), the preferential control related information is information indicating at least one of pieces of information indicating whether or not the preferential control has been performed and the number of communication packets, an amount of communication data, a throughput, and a communication time according to communication based on the preferential control.

(20) Also, according to an aspect of the present invention, an information processing method using a computer includes acquisition step in which an acquisition unit acquires communication data; a priority determination step in which a priority determination unit determines a priority for identifying a priority ranking in communication bandwidth allocation on the basis of the communication data; a preferential control information generation step in which a preferential control information generation unit generates preferential control information on the basis of a determination result of the priority determination unit; and a transmission step in which a transmission unit transmits device identification information for identifying a device which performs communication and the preferential control information to a communication device which relays the communication.

(21) Also, according to an aspect of the present invention, a program causes a computer to execute: an acquisition step of acquiring communication data; a priority determination step of determining a priority for identifying a priority ranking in communication bandwidth allocation on the basis of the communication data; a preferential control information generation strep of generating preferential control information on the basis of a determination result in the priority determination step; and a transmission step of transmitting device identification information for identifying a device which performs communication and the preferential control information to a communication device which relays the communication.

Advantageous Effects of Invention

According to the present invention, it is possible to flexibly perform preferential communication in various situations.

Also, according to the present invention, it is possible to give a user a motivation to communicate with the content provider.

BRIEF DESCRIPTION OF DRAWINGS

FIG. 7 is a diagram illustrating an example of a privilege granting condition of a charging server in the communication system according to the second embodiment of the present invention.

EMBODIMENTS FOR CARRYING OUT THE INVENTION

First Embodiment

Hereinafter, a first embodiment of the present invention will be described with reference to the drawings.
(Configuration of Communication System)
FIG. 1 is a schematic diagram illustrating an example of a network configuration of a communication system according to the first embodiment of the present invention.

A communication system 1 according to the present embodiment is a system configured to control communication performed between a content provider (CP) server and a terminal. The communication system 1 is configured to include, for example, a wireless communication radio access network of the Long Term Evolution (LTE) scheme whose specification is defined by the Third Generation Partnership Project (3GPP) standardization organization for wireless technology.

Figure 1:
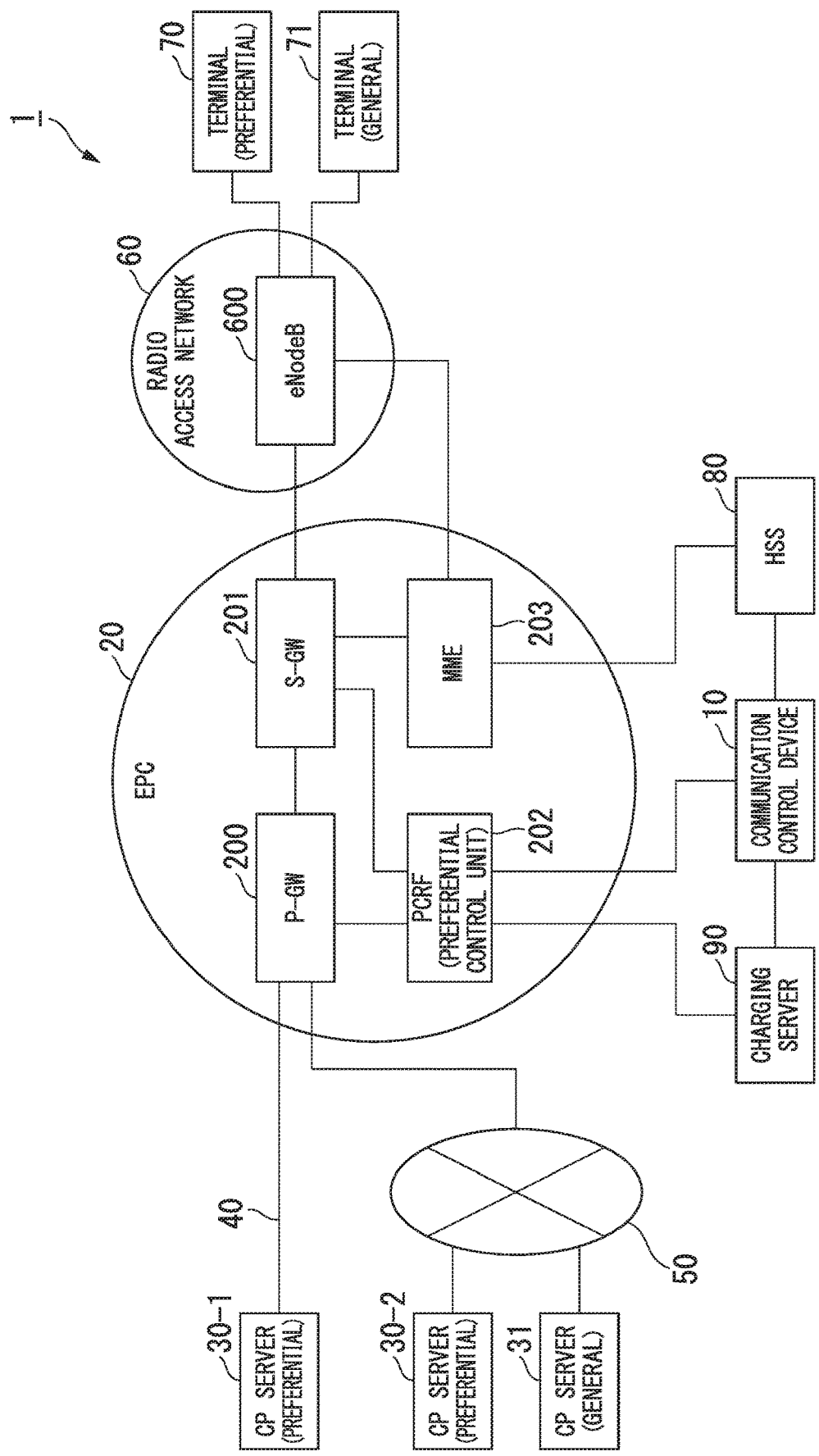
FIG. 1 is a schematic diagram illustrating an example of a network configuration of a communication system according to a first embodiment of the present invention.

As illustrated in FIG. 1, the communication system 1 is configured to include a communication control device 10 (an information processing device), an evolved packet core (EPC) 20, a CP server 30-1, a CP server 30-2, a CP server 31, a closed area network 40, the Internet 50, a radio access network 60, a terminal 70, a terminal 71, a home subscriber server (HSS) 80, and a charging server 90.

The communication control device 10 performs preferential control of communication between the CP server and the terminal. Details of the functional configuration of the communication control device 10 will be described below.

The EPC 20 performs authentication, mobility control, bearer management, charging, quality of service (QoS) control, and the like. The EPC 20 is configured to include a packet data network gateway (P-GW) 200, a serving gateway (S-GW) 201, a policy and charging rules function (PCRF) 202, and a mobility management entity (MME) 203.

The P-GW 200 is a point of a connection to a network outside the EPC 20 and is a gateway configured to perform the allocation of an Internet protocol (IP) address, packet transfer to the S-GW 201, and the like. The S-GW 201 accommodates an eNodeB 600 which is an LTE wireless communication base station, and is a gateway configured to transmit user data.

The PCRF 202 (a preferential control unit) performs QoS control of communication, preferential control, and control for charging. Also, the PCRF 202 may perform preferential control of communication on the basis of information transmitted from the communication control device 10. The MME 203 accommodates the eNodeB 600 and performs mobility management of the terminal, authentication (security control) of the terminal, and the like.

The CP server 30-1 and the CP server 30-2 are CP servers configured to publish specific websites or the like serving as targets of preferential communication and communication between the CP server and a terminal (e.g., the terminal 70 or the terminal 71) may be preferentially performed through the preferential control by the communication control device 10. If a CP server communicably connected to the EPC 20 via the closed area network 40 such as the CP server 30-1 is provided, a CP server communicably connected to the EPC 20 via the Internet 50 such as the CP server 30-2 is also provided.

The CP server 31 is a CP server configured to publish general websites which are not targets of preferential communication. Also, as will be described below, the communication between the CP server 31 and the terminal 71 is not preferentially performed.

Also, content published by the CP server 30-1, the CP server 30-2, and the CP server 31 is not limited to websites, and other content (e.g., video data, audio data, and text data) and applications may be published.

Also, although only one CP server 30-1, one CP server 30-2, and one CP server 31 are illustrated in FIG. 1 for simplicity of description, a plurality of CP servers 30-1, a plurality of CP servers 30-2, and a plurality of CP servers 31 may be provided.

The closed area network 40 is a "closed" network constructed by a communication service provider for its own service. Here, "closed" means that the network is not directly accessed from the Internet 50.

The radio access network 60 is a radio network configured to relay communication between the EPC 20 and terminals (the terminal 70 and the terminal 71). The radio access network 60 is, for example, an evolved universal terrestrial radio access network (E-UTRAN) which is an access network configured to implement wireless communication in the LTE scheme. The radio access network 60 is configured to include an evolved Node B (eNodeB) 600. The eNodeB 600 is a radio base station configured to support wireless communication in the LTE scheme.

The terminal 70 is a specific terminal serving as a target of preferential communication and communication between the terminal and the CP server (e.g., the CP server 30-1, the CP server 30-2, or the CP server 31) may be preferentially performed through preferential control by the communication control device 10.

The terminal 71 is a general terminal that is not a target of preferential communication. Communication between the terminal 71 that is not a target of preferential communication and the CP server 31 that is not a target of preferential communication is not preferentially performed.

Also, although whether or not to preferentially perform communication for each server is determined so that communication to be performed by the CP server 30-1 and the CP server 30-2 is preferentially performed and communication to be performed by the CP server 31 is not preferentially performed in the above description, the present invention is not limited thereto. For example, a configuration in which it is determined whether communication is preferentially performed for each site included in each CP server may be adopted. That is, for example, a configuration in which preferential communication is performed in the case of communication in which access to a specific site is performed and preferential communication is not performed in the case of communication in which access to a site other than the specific site is performed may also be adopted.

The HSS 80 is a subscriber information database of a subscriber (a user) who receives a communication service provided by the communication system 1, and manages authentication information and manages in-service information of terminals (the terminal 70 and the terminal 71).

The charging server 90 is a system for performing a charging process on CP servers (the CP server 30-1, the CP server 30-2, and the CP server 31) or terminals (the terminal 70 and the terminal 71) and is configured to include an online charging system (OCS) or an offline charging system (OFCS).

(Configuration of Communication Control Device)

Next, a functional configuration of the communication control device 10 will be described with reference to the drawings.

Figure 2:
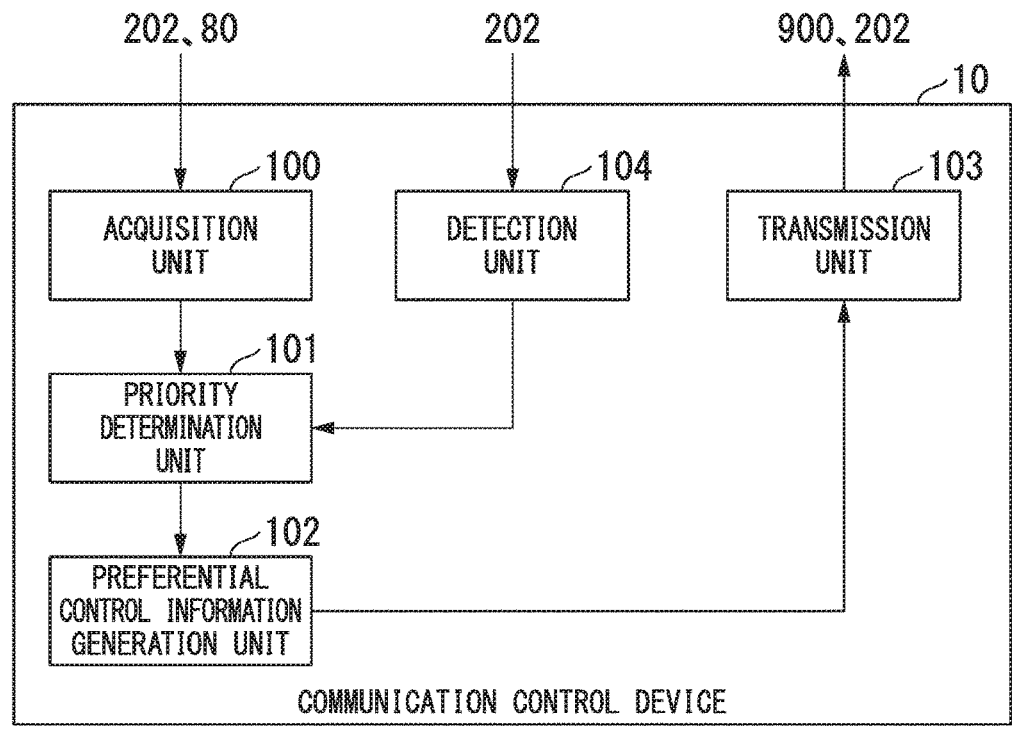
FIG. 2 is a block diagram illustrating a functional configuration of a communication control device in a communication system according to the first embodiment of the present invention.

FIG. 2 is a block diagram illustrating a functional configuration of the communication control device in the communication system according to the first embodiment of the present invention.

The communication control device 10 is configured to include an acquisition unit 100, a priority determination unit 101, a preferential control information generation unit 102, a transmission unit 103, and a detection unit 104.

The acquisition unit 100 acquires communication data from the EPC 20 (via the PCRF 202).

The communication data described herein is data indicating additional information (metadata) related to communication performed in the EPC 20. The communication data includes information used for determining a priority of communication when preferential communication is performed, for example, device identification information for identifying a device that performs communication (e.g., terminal identification information for identifying a terminal that performs communication and CP server identification information for identifying a CP server that performs communication), and the like. The communication data is, for example, data generated by a device of a request source or a request destination of the communication (e.g., the CP server 30-1, the CP server 30-2, or the terminal 70) and transmitted to the EPC 20. Also, the communication data includes, for example, data to be transmitted on the basis of an operation input from a user in the device of the request source or the request destination of the communication (e.g., the CP server 30-1, the CP server 30-2, or the terminal 70).

Also, identification information for identifying the communication device as well as the terminal identification information and CP server identification information may be used as the device identification information. Alternatively, identification information for identifying the user, for example, an identification number of a subscriber identity module (SIM) card, may be used as the device identification information. In addition, for example, identification information (e.g., a user ID) for identifying a user of a website (or an application, content) provided by a content provider (CP) may be used as the identification information for identifying the user. Also, the device identification information may be configured to include information in which identification information (e.g., a user ID) for identifying a user of a device (e.g., the terminal 70, the terminal 71, the CP server 30-1, the CP server 30-2, or the CP server 30-3) connected to the communication device on which the communication control device 10 (the information processing device) performs preferential control, identification information for identifying a user of a device other than the device (e.g., a user ID of a user of the other device), and information indicating an amount of communication data assigned by a user to another user (i.e., an amount of communication data of communication of preferential control) are associated.

Also, the number of pieces of identification information of the user of the other device to be associated in the above description may be two or more (i.e., the number of users of other devices to be associated may be two or more).

That is, for example, information in which a user's identification information input by the user from an application of a device, identification information of a user of another device, and information indicating an amount of communication data assigned by the user to the user of the other device are associated may be included in device identification information in the communication data.

Other examples of the information included in the communication data will be described below.

The priority determination unit 101 analyzes the communication data acquired by the acquisition unit 100, and determines a priority for identifying a priority ranking of communication (e.g., a priority ranking of communication bandwidth allocation or a priority ranking of time slot allocation) on the basis of the communication data when a communication connection request indicated by the communication data satisfies a predetermined condition (a first condition) (e.g., when specific device identification information is included in communication data as described above). Priorities are represented by classes indicating priority rankings, as in, for example "class 1," "class 2," ..., "class 9." For example, the communication determined to be "class 1" has a highest priority, and the communication determined to be "class 9" has a lowest priority ranking.

Also, according to the analysis result of the communication data, the priority determination unit 101 may not determine the priority for communication corresponding to the communication data. In this case, the priority ranking of communication on which the priority determination is not made becomes, for example, a lowest priority ranking.

Also, for example, communication data may be data including a data part (a payload) of an IP packet, and the communication control device 10 may be a device having a deep packet inspection (DPI) function of analyzing a payload in the priority determination unit 101.

The preferential control information generation unit 102 generates preferential control information on the basis of the determination result of the priority determination unit 101. The preferential control information includes preferential details in preferential communication, for example, information indicating an amount of communication bandwidth allocation according to a priority determined by the priority determination unit 101, an amount of time slot allocation according to a priority, or the like.

The transmission unit 103 transmits preferential control information and identification information for identifying communication serving as a target of preferential control (e.g., device identification information such as terminal identification information or CP server identification information) to the PCRF 202. Thereby, the PCRF 202 (a preferential control unit) can control the P-GW 200 (a preferential execution unit) so that preferential communication is performed in accordance with preferential control information received from the communication control device 10 (e.g., so that a communication bandwidth or a time slot indicated by the preferential control information is allocated) with respect to specific communication identified by the identification information received from the communication control device 10.

Also, when a predetermined condition (a second condition) is satisfied, the transmission unit 103 transmits information indicating device identification information, communication destination identification information for identifying communication destination devices (e.g., the CP server 30-1, the CP Server 30-2, and CP server 31) of communication to be performed by a device identified by the device identification information, preferential control related information that is information about preferential control to be performed on the basis of the preferential control information for the communication, and communication related information that is information about the communication to the acquisition unit 900 (to be described below) of the charging server 90 (the charging device). Then, the charging server 90 performs a charging process on the basis of the information.

Also, the communication related information is, for example, information indicating at least one of a communication start clock time, a communication end clock time, information indicating a position where communication has occurred, the number of communication packets, an amount of communication data, a throughput, and a communication time.

Also, the preferential control related information includes, for example, information indicating at least one of pieces of information indicating whether or not preferential control has been performed, information indicating the number of packets transmitted in communication based on preferential control, and the number of hours of communication based on preferential control.

Also, for example, the PCRF 202 (the preferential control unit) may perform a process of determining whether or not to perform preferential control by combining the preferential control information received from the communication control device 10 (an information processing device) and failure information of a communication device received from the P-GW 200 (e.g., EPC 20 or failure information of a failure that has occurred in the radio access network 60).

For example, the failure information of the communication device is information indicating a state in which another communication device adjacent to the communication device accommodating the terminal fails or a failure occurs in the communication device constituting a backbone transmission line through which communication of the terminal passes and it is possible to perform a process of determining non-execution of preferential control or the like because a failure occurs beyond the communication device accommodating the terminal.

Also, although the communication control device 10 includes the priority determination unit 101, and the EPC 20 includes the PCRF 202 (the preferential control unit) and the P-GW 200 (the preferential execution unit) in the communication system 1 according to the present embodiment, the present invention is not limited thereto. For example, the communication system 1 may have a configuration in which the priority determination unit 101, the preferential control unit, and the preferential execution unit are provided in different devices. Alternatively, for example, the communication system 1 may have a configuration in which some or all of the priority determination unit 101, the preferential control unit, and the preferential execution unit are provided in the same device.

The detection unit 104 acquires data indicating a result of detecting a communication state of communication (a communication situation) (also referred to as detection data) in the EPC 20 from the EPC 20 (via the PCRF 202). The communication state described herein is data indicating a state of communication (communication quality) indicated by communication traffic, for example, a usage rate of the communication bandwidth, a throughput, or the like.

The priority determination unit 101 acquires the detection data from the detection unit 104. The priority determination unit 101 determines whether or not to perform preferential control on the basis of a communication situation indicated by the acquired detection data.

That is, according to the communication situation indicated by the acquired detection data, the priority determination unit 101 may not perform a priority determination so that new preferential communication is not performed. For example, if an amount of communication traffic in the entire communication performed in the EPC 20 is larger than a predetermined amount (i.e., the communication is congested), if a proportion of the preferential communication in the entire communication being performed in the EPC 20 is higher than a predetermined proportion, or the like, the priority determination may not be performed. Thereby, the priority determination unit 101 can control the EPC 20 so that new preferential communication is not performed in the case of a communication state in which it is difficult to secure a communication bandwidth for performing newer preferential communication.

Alternatively, for example, if an amount of communication traffic in the entire communication being performed in the EPC 20 is smaller than a predetermined amount or if a proportion of the preferential communication in the entire communication being performed in the EPC 20 is lower than a predetermined proportion, the priority determination unit 101 may not perform a priority determination. Thereby, the priority determination unit 101 can control the EPC 20 so that new preferential communication is not performed in the case of the communication state in which a sufficient communication speed can be secured without performing preferential communication.

Also, if a result of analyzing the communication situation indicated by the acquired detection data indicates that the communication situation satisfies a predetermined condition (the second condition), the priority determination unit 101 may be configured to determine whether or not to make a change to a different priority with respect to specific communication or whether or not to disconnect a preferential connection. When the priority determination unit determines to make a change to a different priority or to disconnect the preferential connection, the preferential control information generation unit 102 generates priority change information indicating a change to a different priority or preferential disconnection information indicating a disconnection of a preferential connection on the basis of a determination result of the priority determination unit 101. Then, the transmission unit 103 transmits the priority change information or the preferential disconnection information generated by the preferential control information generation unit 102 to the PCRF 202 (the preferential control unit) of the EPC 20 (a communication device).

Also, although the number of communication devices is set to one for simplifying the description in the above description, a plurality of communication devices may be present. In this case, for example, the detection unit 104 detects a communication situation in one or more communication devices and the transmission unit 103 transmits preferential control information, priority change information, or preferential disconnection information to one or more communication devices.

Also, the priority determination unit 101 may be configured to select a communication device which is a transmission destination of the preferential control information, the priority change information, or the preferential disconnection information on the basis of path information indicating a communication path so that the detection unit 104 acquires the path information from the EPC 20 in addition to the detection data indicating the communication situation.

Also, the predetermined condition (the second condition) described above is, for example, that a usage proportion of the communication bandwidth in the communication device in which specific communication is performed exceeds a predetermined threshold value.

Also, for example, whether or not the usage proportion exceeds the predetermined threshold value may be determined on the basis of whether or not an average value of the usage proportion of the communication bandwidth during any latest period exceeds a predetermined threshold value. Alternatively, for example, whether or not the usage proportion exceeds the predetermined threshold value may be determined on the basis of whether or not the usage proportion of the communication bandwidth exceeds the threshold value at least once during any latest period.

Alternatively, the above-described predetermined condition (the second condition) may be, for example, that the number of simultaneous connections of communication in a communication device in which specific communication is performed exceeds a predetermined threshold value.

Also, for example, whether or not the number of simultaneous connections of communication exceeds the predetermined threshold value may be determined on the basis of whether or not the average value of the number of simultaneous connections of communication during any latest period exceeds a predetermined threshold value.

Alternatively, whether or not the number of simultaneous connections of communication exceeds the predetermined threshold value may be determined on the basis of, for example, whether or not the number of simultaneous connections of communication exceeds the threshold value at least once during any latest period.

Alternatively, the above-described predetermined condition (the second condition) is, for example, that specific communication is communication in a predetermined time period or that a communication area of a communication device in which the communication is performed is a predetermined communication area.

Also, data indicating a table in which the device identification information of the communication device and the communication area (a communication range) of the communication device are associated is pre-stored in a storage unit (not illustrated) provided in the priority determination unit 101 of the communication control device 10 and the priority determination unit 101 may be configured to determine that the communication area (the communication range) of the communication device is a predetermined communication area (communication range) on the basis of device identification information of the communication device included in the communication data and data indicating the table.

Alternatively, a configuration in which the communication data includes a base station ID for identifying the base station (e.g., the eNodeB 600) and data indicating a table in which the base station ID and the communication area are associated is pre-stored in a storage unit (not illustrated) provided in the priority determination unit 101 of the communication control device 10 may be adopted. Thereby, the priority determination unit 101 can determine that the communication area (the communication range) of the communication device is a predetermined communication area (communication range) on the basis of the base station ID included in the communication data and the table.

Also, a configuration in which the communication control device 10 acquires device identification information of a communication device constituting a communication area in which a specific device (e.g., a terminal or a CP server) is accommodated from a table stored in an external device and preferential control information, priority change information, or preferential disconnection information is transmitted to the communication device may be adopted.

Also, position information indicating a position of the device (e.g., the terminal or the CP server) may be included in the communication data and whether or not the communication area (the communication range) of the communication device is a predetermined communication area (communication range) may be determined on the basis of whether or not the position indicated by the position information is included in the communication area (the communication range) of the communication device.

In this case, for example, the position of the device (e.g., the terminal or the CP server) may be in the vicinity of a boundary of a plurality of communication areas of a plurality of communication devices and the number of communication devices to which the device can be connected may be two or more. Then, when the communication control device 10 determines the communication device serving as a transmission destination of the preferential control information, the device may be connected to another communication device (e.g., according to a handover). Thereby, a difference between the communication device having received the preferential control information from the communication control device 10 and the communication device to which the device (the terminal, the CP server, or the like) is connected may be caused. In order to eliminate this difference, the communication control device 10 may be configured to transmit preferential control information, priority change information, or preferential disconnection information from the position of the device to a plurality of communication devices located within a predetermined range.

Alternatively, the above-described predetermined condition (the second condition) is, for example, that an average throughput in a device (e.g., the terminal or the CP server) connected to a communication device in which specific communication is performed is less than a predetermined threshold value.

In addition, the duration of one preferential connection is predetermined and the PCRF 202 (the preferential control unit) may perform preferential control of communication by controlling the P-GW 200 and the base station (e.g., the eNodeB 600) on the basis of the duration. Also, as described above, preferential control of communication may be configured to be managed by the PCRF 202, a base station (e.g., the eNodeB 600), a repeater base station (not illustrated), and the like as well as the communication control device 10. When a plurality of devices manage the preferential control of communication, it is possible to reduce a load due to centralized management in the communication control device 10.

Also, specifically, in the EPC 20 and the radio access network 60, the preferential control is executed as follows. The following description is similar to description of any of preferential control examples to be described below.

For example, the PCRF 202 outputs a policy and charging control (PCC) rule indicating a rule based on information for identifying communication acquired from the communication control device 10 and data indicating an amount of communication bandwidth allocation to the P-GW 200. The P-GW 200 having received the PCC rule requests the S-GW 201 to generate a priority bearer (a dedicated bearer) and issues an instruction for starting quality of service (QoS) control according to the PCC rule. Also, the dedicated bearer is a bearer additionally set for the default bearer in units of QoS.

When the S-GW 201 starts the QoS control according to the PCC rule and the setting of the dedicated bearer between the P-GW 200 and the S-GW 201 is completed, the S-GW 201 requests the MME 203 to set up the dedicated bearer.

Then, the MME 203 requests the eNodeB 600 to set up an evolved universal terrestrial radio access network (E-UTRAN) radio access bearer (E-RAB).

In response to the request, the eNodeB 600 transmits a radio resource control (RRC) reset request to the terminal (e.g., the terminal 70 or the terminal 71). The terminal (e.g., the terminal 70 or the terminal 71) establishes a communication connection with the eNodeB 600 in accordance with reception of the RRC reset request.

When a communication connection with the eNodeB 600 is established, the terminal (e.g., the terminal 70 or the terminal 71) transmits a completion notification to the eNodeB 600. In accordance with the reception of the completion notification, the eNodeB 600 transmits an E-RAB setup response to the MME 203.

In accordance with the reception of the E-RAB setup response, the MME 203 transmits a response indicating that the dedicated bearer has been set up to the S-GW 201.

In accordance with the reception of the response indicating that the dedicated bearer has been set up, the S-GW 201 transmits the response to the P-GW 200.

As described above, when the dedicated bearer is generated, a communication connection of preferential communication is established and a service according to communication band allocation based on data indicating information for identifying the communication transmitted from the communication control device 10 and data indicating an amount of communication bandwidth allocation transmitted from the communication control device 10 starts to be provided to the terminal (e.g., the terminal 70 or the terminal 71).

Because more details of a procedure of generating the dedicated bearer are described in, for example, the following document, description thereof will be omitted. "3GPP TS 23.402 V13.4.0 (2015-12), 3rd Generation Partnership Project; Technical Specification Group Services and System Aspects; Architecture enhancements for non-3GPP accesses (Release 13)," PP. 86 to 90, "5.4 Dedicated Bearer Procedures for E-UTRAN Access with PMIP-based S5/S8."

(Configuration of Charging Server)

Next, a functional configuration of the charging server 90 will be described with reference to the drawings.

Figure 3:
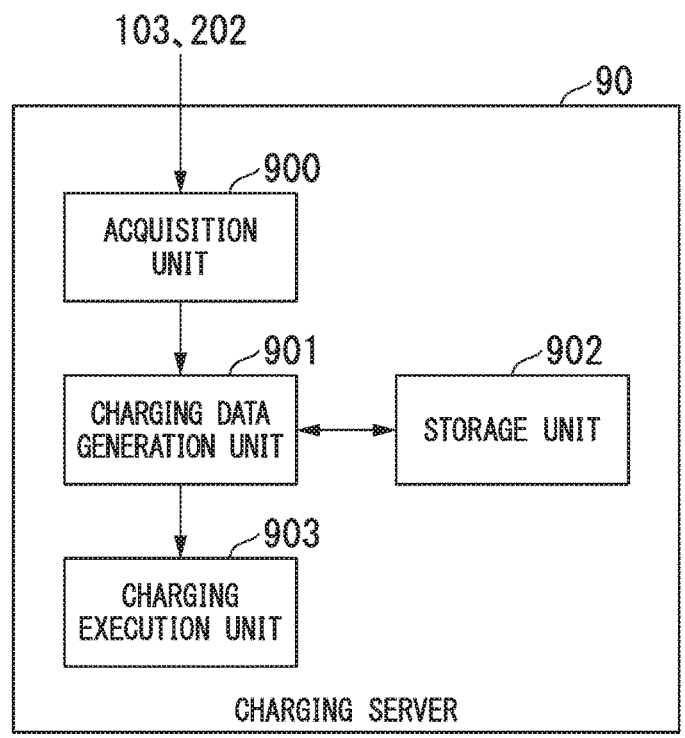
FIG. 3 is a block diagram illustrating a functional configuration of a charging server in the communication system according to the first embodiment of the present invention.

FIG. 3 is a block diagram illustrating a functional configuration of the charging server in the communication system according to the first embodiment of the present invention.

The charging server 90 includes an acquisition unit 900, a charging data generation unit 901, a storage unit 902, and a charging execution unit 903.

The acquisition unit 900 acquires information indicating device identification information, communication destination identification information for identifying a device (e.g., the CP server 30-1, the CP server 30-2, or the CP server 31) of a communication destination of communication to be performed by a device identified by device identification information, preferential control related information which is information about preferential control to be performed on the communication on the basis of the preferential control information, and communication related information which is information about the communication from the transmission unit 103 of the communication control device 10 or the PCRF 202 (the preferential control unit) of the EPC 20. The acquisition unit 900 outputs the information to the charging data generation unit 901.

The charging data generation unit 901 determines a charging destination on the basis of at least one piece of information indicating the device identification information, the communication destination identification information, the preferential control related information, and the communication related information acquired from the acquisition unit 900 and various types of information stored in the storage unit 902 and generates charging data. For example, the charging data includes information indicating the charging destination and information indicating a communication fee on the basis of the communication destination identification information.

For example, the various types of information stored in the storage unit 902 is information indicating a table in which device identification information, communication destination identification information, preferential control related information, or communication related information and charging information (e.g., a charging method, a communication fee, and the like) are associated, information indicating a charging destination, and the like.

That is, the charging data generation unit 901 generates charging data on the basis of the information acquired from the acquisition unit 900 and the information stored in the storage unit 902.

The storage unit 902 is configured to include a storage medium, for example, a hard disk drive (HDD), a flash memory, an electrically erasable programmable read only memory (EEPROM), a read only memory (ROM), a random access read/write memory (RAM), or any combination thereof.

The charging execution unit 903 performs a charging process on a charging destination on the basis of the charging data input from the charging data generation unit 901.

Also, for example, the storage unit 902 provided in the charging server 90 may be configured to pre-store a table in which identification information for identifying a user (e.g., a user ID for identifying a user of a website provided by the CP (or an application or content)) managed by the CP and an immediately previous URL at which a predetermined process (e.g., a purchase process or the like) of the user was performed (or a URL through which the predetermined process of the user was performed) are associated. Alternatively, an external device may store the table. Also, the URL can be acquired from, for example, access history information (e.g., a referrer or the like) of the user.

Then, the charging data generation unit 901 collates the URL included in the table with the URL associated with the device identification information (including the user ID), the communication destination identification information, or the preferential control related information included in the communication data. If a predetermined URL (e.g., a URL indicating a place on a communication network provided to the CP by a communication service provider configured to perform preferential control of communication) is included within collated URLs, the charging data generation unit 901 may generate charging data indicating a predetermined process (e.g., a process of discounting a user's communication fee or increasing a fee for the CP or the like) on the basis of the information acquired from the storage unit 902 and output the generated charging data to the charging execution unit 903. Thereby, the communication system 1 can perform the charging process according to the URL used by the user as well as the charging process based on a communication connection destination or the like.

Also, the storage unit 902 provided in the charging server 90 may be configured to store a table in which an identification number for identifying a user, an upper limit value of an amount of communication data of communication based on preferential control based on an input from the user (an upper limit value of an amount of preferential communication data), and an amount of communication data of communication based on preferential control on the basis of an input from the user included in preferential control related information are associated (or the storage unit 902 may pre-store the table or an external device may store the table).

Also, the user of the above-described device is not limited to the user of the terminal and may be a user related to the CP of the CP server (e.g., a content manager in the CP).

From the device identification information, the charge data generation unit 901 acquires information in which user identification information, identification information of a user of another device, and information indicating an amount of communication data assigned by a user to the user of the other device are associated.

The charging data generation unit 901 may be configured to add an amount of communication data of communication based on preferential control assigned by a user to a user of another device to an upper limit value of an amount of preferential communication data other than a charging target corresponding to an identification number of the user of the other device. Alternatively, the charging data generation unit 901 may be configured to add a fee corresponding to an amount of communication data of communication based on preferential control assigned by the user to the user of the other device to charging information (e.g., a communication fee or the like) corresponding to the user's identification number.

Thereby, for example, the communication system 1 can implement a service in which an amount of preferential communication data newly purchased by a user can be presented to another user.

Also, the charging data generation unit 901 may be configured to calculate a difference value (a difference 1) between the upper limit value of the amount of preferential communication data of the user and the amount of preferential communication data of the user acquired from the storage unit 902. If the difference 1 is a negative value, the charging data generation unit 901 may be configured so that the above-described addition process is not performed. Alternatively, the charging data generation unit 901 may be configured to perform a predetermined process corresponding to predetermined error details.

Also, if the difference 1 is a positive value, the charging data generation unit 901 may be configured to calculate a difference value (a difference 2) between the difference 1 and the amount of communication data of communication based on preferential control assigned by the user to another user.

If the difference 2 is a negative value, the charging data generation unit 901 may be configured so that the above-described addition process is not performed.

Alternatively, the charging data generation unit 901 may be configured to perform a predetermined process corresponding to predetermined error details.

If the difference 2 is a positive value, the preferential communication control unit 11 may be configured to add an amount of communication data of communication based on preferential control assigned by the user to a user of another device to an upper limit value of an amount of preferential communication data other than a charging target corresponding to identification information of the user of the other device.

Then, the charging data generation unit 901 subtracts the amount of communication data of the communication based on the preferential control assigned by the user to the other user from the amount of preferential communication data of the user.

Thereby, for example, the communication system 1 can also implement a service for enabling the user to present a remaining amount of preferential communication data after using a new purchase to another user.

Also, for example, the CP server (e.g., the CP server 30-1, the CP server 30-2, and the CP server 31) may be configured to create a table in which CP server identification information, identification information for identifying the user, and information indicating the amount of communication data for communication based on preferential control assigned by the CP to the user are associated and the CP server may be configured to transmit the table to the communication system (e.g., the communication system 1) managed by the communication service provider. Also, the communication service provider and the CP may be the same service provider.

For example, the amount of communication data of the communication based on the preferential control assigned by the CP to the user may be an amount of communication data corresponding to an amount of money charged to the user in the CP server managed by the CP.

Then, the communication system (e.g., the communication system 1) managed by the communication service provider causes the storage unit 902 of the charging server 90 to store the above-described table.

Thereby, for example, the CP can implement a service for assigning an amount of preferential communication data to the user as a privilege corresponding to an amount of money spent on products purchased on a site (e.g., an EC site) on the CP server by the user who receives a service provided from the CP.

(Operation of Communication System)

Next, an operation of the communication system 1 will be described with reference to the drawings.

Figure 4:
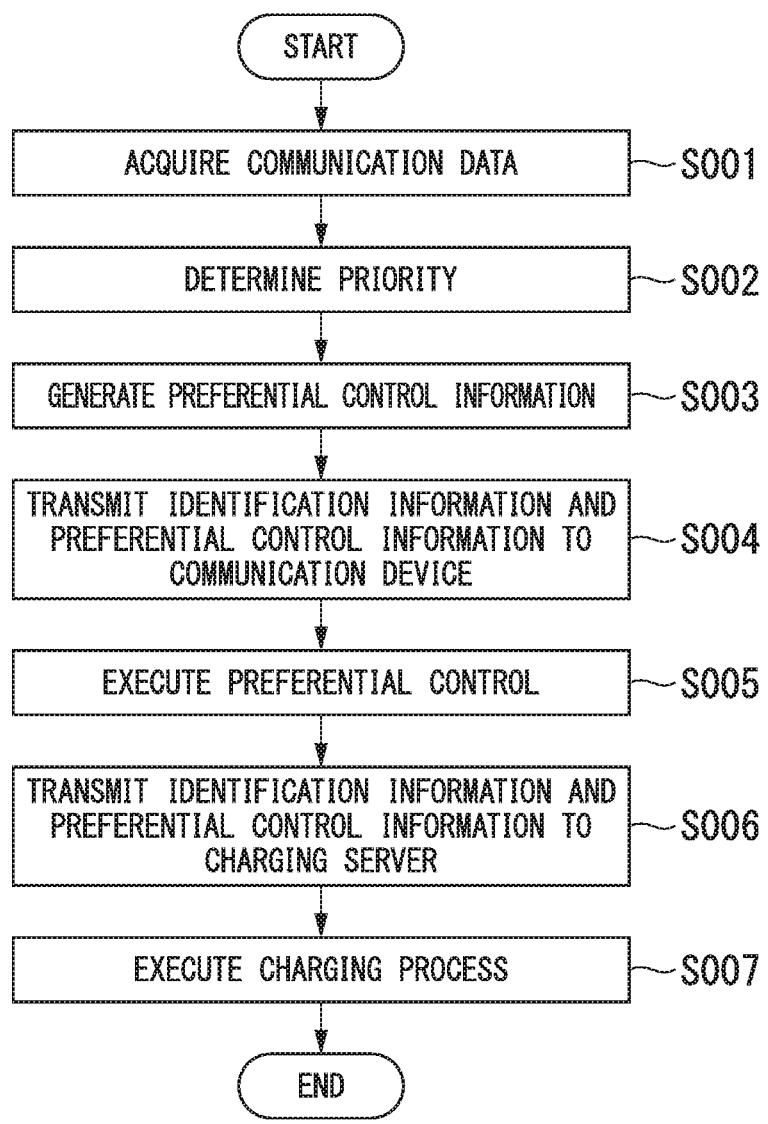
FIG. 4 is a flowchart illustrating an operation of the communication system according to the first embodiment of the present invention.

FIG. 4 is a flowchart illustrating an operation of the communication system according to the first embodiment of the present invention.

The present flowchart is started when the acquisition unit 100 of the communication control device 10 receives communication data transmitted from the EPC 20 (via the PCRF 202). Also, timings at which the EPC 20 transmits the communication data to the communication control device 10 are, for example, a timing at which a request for a new communication connection is generated, a timing at which a request for making a change from general communication which is not preferential communication to preferential communication is generated, a timing at which a priority change request is generated in preferential communication, and the like.

(Step S001) The acquisition unit 100 of the communication control device 10 acquires communication data from the EPC 20 (via the PCRF 202). The acquisition unit 100 outputs the communication data acquired from the EPC 20 to the priority determination unit 101. Thereafter, the process proceeds to step S002.

(Step S002) The priority determination unit 101 acquires the communication data output from the acquisition unit 100. The priority determination unit 101 analyzes the acquired communication data, and extracts identification information (e.g., terminal identification information, CP server identification information, or the like) for identifying communication included in the communication data and priority information associated with the identification information. The priority determination unit 101 determines a priority on the basis of the extracted priority information. The priority determination unit 101 outputs information indicating a priority determination result and the identification information to the preferential control information generation unit 102. Thereafter, the process proceeds to step S003.

(Step S003) The preferential control information generation unit 102 acquires the information indicating the priority determination result output from the priority determination unit 101 and the identification information. The preferential control information generation unit 102 determines details of the preferential communication in accordance with the priority determination result indicated by the acquired information (e.g., a communication bandwidth allocated to preferential communication or an amount of time slot allocation in accordance with the priority determination result). Also, the priority determination result and details of the preferential communication (e.g., a table in which the communication bandwidth allocated to the preferential communication or the amount of time slot allocation are associated) is pre-stored in the storage unit (not illustrated) provided in the preferential control information generation unit 102. Also, the table may be stored in an external device and the communication control device 10 may be configured to acquire data indicating the communication bandwidth allocated to the preferential communication or the amount of time slot allocation from the table stored in the external device.

The preferential control information generation unit 102 outputs the identification information and data indicating the communication bandwidth allocated to the preferential communication or the amount of time slot allocation to the transmission unit 103. Thereafter, the process proceeds to step S004.

(Step S004) The transmission unit 103 acquires the identification information and the data indicating the communication bandwidth allocated to the preferential communication or the amount of time slot allocation output from the preferential control information generation unit 102. The transmission unit 103 transmits the identification information and the data indicating the communication bandwidth allocated to the preferential communication or the amount of time slot allocation to the PCRF 202 (the preferential control unit) of the EPC 20. Thereafter, the process proceeds to step S005.

(Step S005) The PCRF 202 (the preferential control unit) of the EPC 20 acquires the identification information and the data indicating the communication bandwidth allocated to the preferential communication or the amount of time slot allocation output from the transmission unit 103 of the communication control device 10. The EPC 20 controls the P-GW 200 so that a communication bandwidth based on the acquired data or the amount of time slot allocation is allocated with respect to communication corresponding to the acquired identification information (e.g., communication to be performed by the terminal corresponding to the acquired terminal identification information or communication to be performed by the CP server corresponding to the acquired CP server identification information).

In accordance with an instruction from the PCRF 202 (the preferential control unit), the P-GW 200 (the preferential execution unit) allocates a specified communication bandwidth or time slot to specified communication.

Accordingly, a communication connection based on preferential communication is established.

(Step S006) When a predetermined condition (the second condition) is satisfied, the transmission unit 103 transmits information indicating device identification information, communication destination identification information for identifying a device (e.g., the CP server 30-1, the CP server 30-2, and the CP server 31) of a communication destination of communication performed in a device identified by the device identification information, preferential control related information which is information about preferential control performed on the basis of the preferential control information for the communication, and communication related information which is information related to communication to the acquisition unit 900 (to be described below) of the charging server 90 (the charging device).

(Step S007) The charging server 90 performs a charging process on the basis of the information acquired from the transmission unit 103 in step S006. For example, the charging process is performed as follows.

The charging data generation unit 901 of the charging server 90 determines a charging destination and generates charging data on the basis of at least one piece of the information indicating the device identification information, the communication destination identification information, the preferential control related information, and the communication related information acquired from the acquisition unit 900 and various types of information stored in the storage unit 902. For example, the charging data includes information indicating the charging destination and information indicating a communication fee on the basis of the communication destination identification information.

The various types of information stored in the storage unit 902 is, for example, information indicating a table in which the device identification information, the communication destination identification information, the preferential control related information, or the communication related information is associated with charging information (e.g., a charging method, a communication fee, or the like), information indicating the charging destination, and the like.

That is, the charging data generation unit 901 generates the charging data on the basis of the information acquired from the acquisition unit 900 and the information stored in the storage unit 902.

The charging execution unit 903 performs a charging process on the charging destination on the basis of the charging data input from the charging data generation unit 901.

Accordingly, the present flowchart ends.

Also, the P-GW 200 (the preferential execution unit) may be configured to cause preferential control to be performed by transmitting preferential control information to all devices arranged along a communication path between the terminal (e.g., the terminal 70 or the terminal 71) and the P-GW 200 or the eNodeB 600 from the terminal (e.g., the terminal 70 or the terminal 71) and between the terminal and the CP server (the CP server 30-1, the CP server 30-2, or the CP server 31).

Accordingly, the present flowchart ends.

The communication control device 10 according to the present embodiment can perform preferential control of communication on the basis of various types of communication data. Hereinafter, examples of a priority or a priority ranking determined in accordance with a condition (the first condition) based on some communication data and information indicated by the communication data will be described.

(Communication Data Example 1)

For example, as described above, the communication data includes priority information indicating a priority ranking or a priority of communication. For example, as described above, the priority information includes data indicating a class indicating the priority such as "class 1," "class 2," and "class 3." Also, for example, the priority information may be data indicating a priority with a value from 1 to 100 by setting a priority of communication having a highest priority to 100. In this case, for example, the priority determination unit 101 may be configured to make a determination of a priority and a determination of a priority ranking by determining the class as "class 1" when the above value is greater than or equal to 80, determining the class as "class 2" when the above value is greater than or equal to 40 and less than 80, and determining the class as "class 3" when the above value is less than 40.

Also, although an example in which the priority information indicating the priority ranking or the priority of communication is included in the communication data has been described above, the present invention is not limited thereto. For example, the communication data includes identification information such as terminal identification information or CP server identification information, and the priority determination unit 101 may be configured to include a storage unit (not illustrated) configured to pre-store a table in which identification information for identifying communication (e.g., terminal identification information, CP server identification information, or the like) and priority information are associated and acquire priority information associated with the identification information included in the communication data from the table. Alternatively, for example, the priority determination unit 101 may be configured to acquire priority information associated with identification information included in communication data from an external device (e.g., the HSS 80 or the like).

(Communication Data Example 2)

The communication data includes, for example, information indicating an operation input by a user in a terminal that performs communication. The information includes, for example, information indicating that a preferential connection is requested or information for identifying a priority ranking. That is, in the present example, for example, the user operates the terminal to request a desired preferential connection and preferential communication is performed on the basis of the request. Also, for example, communication data includes information indicating a priority ranking according to contract details between a user and a communication service provider (e.g., a service provider for providing a communication service by using the EPC 20 and a service provider for providing a wireless communication service by using the radio access network 60) (a contract plan that a user joins) or contract details between a user and a content provider (e.g., a service provider for providing content by using the CP server 30-1, the CP server 30-2, and the CP server 31 or the like).

Also, information indicating an operation input by the user may include a clock time at which the user last operated the terminal that performs communication. In this case, for example, it is possible to acquire the clock time at which the user last operated the terminal by acquiring a clock time at which an operation event of a physical key, a touch screen, or the like of the terminal occurred.

Thereby, for example, it is possible to prevent preferential control from being performed on communication from a malicious program or the like which automatically continuously gives a threat (e.g., a denial of service (DOS) attack or the like) to the communication network without requiring a user operation.

If an elapsed time from a clock time at which the user last operated the terminal exceeds a predetermined time, the priority determination unit 101 may transmit priority change information indicating a change to a different priority or preferential disconnection information indicating disconnection of a preferential connection to a communication device. For example, if the time exceeds a predetermined time, the priority determination unit 101 may transmit the priority change information indicating a change to a different priority or the preferential disconnection information indicating disconnection of a preferential connection to the communication device.

(Communication Data Example 3)

The communication data includes, for example, identification information for identifying an application, identification information for identifying a communication connection destination, a base station ID for identifying a base station (e.g., the eNodeB 600), a uniform resource locator (URL) associated with the communication connection destination, or information indicating a configuration of an IP address associated with a communication connection destination. Also, for example, the communication data may include time period information indicating that communication data is transmitted or received in a predetermined time period, place information indicating that communication data is transmitted from a device located in a predetermined place (e.g., the terminal 70, the terminal 71, the CP server 30-1, the CP server 30-2, the CP server 31, and a communication device (e.g., the EPC 20 and the radio access network 60)), or communication type information indicating that communication data is a predetermined type of communication data.

Further, for example, the communication data may include an identifier (ID) indicating a model number or the like of a specific communication module (e.g., an LTE communication module). Thereby, the communication system 1 can perform preferential control of communication on all "things" capable of being uniquely identified in the Internet of things (IoT) which is a mechanism in which "things" capable of being uniquely identified are connected to the Internet or a cloud and mutual control is performed by exchanging information.

The priority determination unit 101 determines a priority in accordance with information indicating the identification information, the URL, the IP address, or a configuration of the IP address (e.g., a length of a character string of the IP address, a version of the IP address (e.g., IPv4, IPv6, or the like), the time period information, the place information, the communication type information, and the like. That is, for example, if an application corresponding to specific identification information (identification information installed in the terminal) performs communication on the terminal (e.g., the terminal 70) side, preferential communication is performed. Also, for example, if a communication connection destination (e.g., a specific CP server, a specific site, or the like) corresponding to specific identification information or a communication connection destination corresponding to a specific IP address (e.g., the CP server 30-1 and the CP server 30-2) performs communication, preferential communication is performed.

Also, the priority determination unit 101 may change (update) a priority of specific preferential communication by re-determining the priority in accordance with a communication state indicated by the acquired detection data. A change in a priority may be a change of a priority of preferential communication to a higher priority or a lower priority. For example, if the number of terminals which perform preferential communication in a certain priority exceeds a predetermined number, or if a proportion of the communication bandwidth used in the EPC 20 (the communication device) exceeds a predetermined proportion, the priority determination unit 101 changes (updates) a priority of communication to be performed by any one of a plurality of devices (e.g., the CP server 30-1, the CP server 30-2, or the terminal 70) connected to a communication deice, which is a device meeting a predetermined condition, to a higher priority or a lower priority.

Also, the priority determination unit 101 starts a determination of a priority on the basis of communication data indicating a request for starting preferential communication. In that case, the priority determination unit 101 may change a priority of other preferential communication that is already being executed (e.g., change to a lower priority). Also, the priority determination unit 101 terminates the determination of the priority on the basis of communication data indicating a request of terminating the preferential communication. In this case, the priority determination unit 101 may change a priority of other preferential communication that is being executed (e.g., a change to a higher priority).

Also, for example, a request source device of the preferential communication or an application of the request source device may be configured to periodically acquire a state of the application of the request source device itself or the request source device itself.

In this case, for example, an error having occurred in the request source device of the preferential communication or the application of the request source device is detected by the request source device itself or the application of the request source device itself, and the request source device of the preferential communication transmits communication data indicating a request for terminating the preferential communication if the error is a predetermined error. Then, the priority determination unit 101 may terminate a priority determination on the basis of the acquired communication data.

Also, the request source device of the preferential communication or the application of the request source device can detect an error of the request destination device on the basis of information received from the request destination device of the preferential communication, so that the request source device of the preferential communication may transmit the communication data indicating the request for terminating the preferential communication if the detected error is a predetermined error.

Also, for example, if preferential communication is performed in accordance with use of a predetermined application of a request source device of preferential communication, the preferential communication may be terminated on the basis of use of another application (e.g., information indicating that another application is started). Also, for example, if the preferential communication is performed in accordance with use of a predetermined application of the request source of the preferential communication, the preferential communication may be configured to be terminated on the basis of the fact that a time for which the application is not used exceeds a predetermined time. Also, for example, if the preferential communication is performed in accordance with the use of the predetermined application of the request source of the preferential communication, the preferential communication may be terminated on the basis of the fact that the state of the application has transitioned to a predetermined state (e.g., a state in which the application operates in the background or the like).

The communication system 1 according to the present embodiment can perform various preferential control. Next, preferential control performed by the communication control device 10 and the PCRF 202 (the preferential control unit) will be described with some examples.

(Preferential Control Example 1)

The PCRF 202 (the preferential control unit) controls the P-GW 200 (the preferential execution unit) on the basis of information for requesting a preferential connection (e.g., a request for starting a preferential connection, a request for terminating a preferential connection, or a request for changing a priority of a preferential connection) included in the communication data acquired from the communication control device 10.

Also, the PCRF 202 (the preferential control unit) controls the P-GW 200 (the preferential execution unit) so that a communication bandwidth or a time slot is allotted to the communication on the basis of identification information for identifying communication (e.g., terminal identification information or CP server identification information) included in the communication data acquired from the communication control device 10 and information indicating a priority ranking or a priority of communication bandwidth or time slot allocation included in the communication data.

Thereby, the PCRF 202 (the preferential control unit) can perform preferential control by maintaining differences in a communication bandwidth or an amount of time slot allocation for each communication on the basis of the terminal identification information for identifying the terminal that performs communication or the CP server identification information for identifying the CP server that performs communication.

Also, the priority information may be information indicating a priority ranking or a priority of a communication connection source in communication or a communication connection destination in communication. That is, the priority information may be information indicating the priority ranking or the priority pre-associated with information for identifying a device that performs the communication (e.g., terminal identification information, CP server identification information, or the like).

(Preferential Control Example 2)

The detection unit 104 of the communication control device 10 acquires detection data from the EPC 20 (via the PCRF 202). In the present example, the detection data includes data indicating the number of communication connections (i.e., the number of simultaneous connections) connected in communication in the EPC 20. The detection unit 104 outputs the acquired detection data to the priority determination unit 101. If the number of simultaneous connections indicated by the acquired detection data exceeds a predetermined number, the priority determination unit 101 does not determine a priority of communication. That is, even when communication data indicating a request for new preferential communication is acquired from the EPC 20, the priority determination unit 101 does not make a priority determination for the request if the number of simultaneous connections indicated by the detection data (e.g., the number of simultaneous connections in the eNodeB 600 with which a terminal that performs communication indicated by the communication data establishes a communication connection) exceeds a predetermined number. Thereby, the communication control device 10 can perform preferential control so that new preferential communication is not started if the number of simultaneous connections of communication in the EPC 20 exceeds a predetermined number.

Also, the above is preferential control for preventing new preferential communication from being started if the number of simultaneous connections exceeds a predetermined number. For example, preferential control may be performed as follows.

If the number of simultaneous connections exceeds the predetermined number, the preferential control may be preferential control in which termination of the preferential communication or a change in the priority is performed in order from communication to be performed by a terminal with a lower priority or communication to be performed by a terminal with a longer duration time of preferential communication.

Also, the preferential control may be preferential control in which the preferential communication is terminated if the number of simultaneous connections is less than a predetermined number. That is, because the number of simultaneous connections is small and, for example, more communication bandwidth to be allocated to communication during a communication connection can be secured, control for prioritizing only specific communication may not be performed.

Although an example in which the priority determination unit 101 determines whether or not the number of simultaneous connections exceeds a predetermined number has been described above, the present invention is not limited thereto. For example, the PCRF 202 (the preferential control unit) monitors the number of simultaneous connections and the PCRF 202 (the preferential control unit) may not transmit communication data to the communication control device 10 if the number of simultaneous connections has reached a predetermined number. Thereby, the PCRF 202 (the preferential control unit) can perform preferential control by limiting the number of simultaneous connections of communication in the EPC 20.

(Preferential Control Example 3)

The detection unit 104 of the communication control device 10 acquires detection data from the EPC 20 (via the PCRF 202) periodically (e.g., every 10 seconds). In the present example, the detection data includes identification information for identifying preferential communication and information indicating a clock time at which preferential communication is started with respect to all preferential communication during a communication connection in the EPC 20. The detection unit 104 outputs the acquired detection data to the priority determination unit 101. In the present example, the priority determination unit 101 includes a storage unit (not illustrated) configured to temporarily store the detection data. The detection data stored in the storage unit is overwritten and updated every time the detection unit 104 acquires new detection data.

On the basis of the information included in the detection data stored in the storage unit (i.e., the identification information for identifying the preferential communication and the information indicating the clock time at which preferential communication is started), the priority determination unit 101 determines to make the priority higher for communication in which preferential communication has started from an earlier time within preferential communication being connected. Thereby, the communication control device 10 can perform preferential control so that more communication bandwidth or time slots are allocated to communication in which preferential communication is started from an earlier time within preferential communication during a communication connection in the EPC 20.

Also, although the priority determination unit 101 determines to make the priority higher for communication in which preferential communication is started from an earlier time within the preferential communication being connected in the present example, the priority may conversely be determined to be lower.

Also, an example in which the priority determination unit 101 performs preferential control on the basis of information indicating a clock time at which preferential communication was started or the like has been described above, the present invention is not limited thereto. For example, the PCRF 202 (the preferential control unit) may be configured to control the P-GW 200 so that a clock time of preferential communication is managed and the amount of communication bandwidth or an amount of time slot allocation is increased (or decreased) for communication in which a start clock time of preferential communication is earlier within the preferential communication being connected. Thereby, the PCRF 202 (the preferential control unit) can perform preferential control in which the amount of communication bandwidth or the amount of time slot allocation for previously connected preferential communication is greater or less than that for subsequently connected preferential communication.

Also, the priority determination unit 101 or the PCRF 202 (the preferential control unit) may have a configuration in which control is performed so that a connection time of preferential communication is managed for each of various types of identification information (e.g., terminal identification information and CP server identification information) and the amount of communication bandwidth or the amount of time slot allocation is decreased for communication in which the number of sequential communication packets or the number of accumulated communication packets based on preferential communication is greater than a predetermined value from a predetermined start clock time to a predetermined end clock time. (Also, in this case, for example, the priority determination unit 101 or the PCRF 202 (the preferential control unit) may be configured to control the preferential control unit so that the amount of time slot allocation is decreased during the next or subsequent connection with respect to a terminal of already disconnected communication.) Also, for example, the communication system 1 can perform preferential control of a terminal or the like that performs preferential communication in excess of the overall average of a packet flow rate in preferential communication by setting the predetermined value to an average value of a packet flow rate in preferential communication managed for terminal identification information from a predetermined start clock time to a predetermined end clock time.

(Preferential Control Example 4)

Similar to the above-described preferential control example 3, the detection unit 104 of the communication control device 10 acquires detection data from the EPC 20 (via the PCRF 202) periodically (e.g., every 10 seconds).

In the present example, the detection data includes identification information for identifying preferential communication and information indicating an elapsed time (a preferential connection time) from a start of preferential communication for all preferential communication during a communication connection in the EPC 20. The detection unit 104 outputs the acquired detection data to the priority determination unit 101. In the present example, the priority determination unit 101 includes a storage unit (not illustrated) configured to temporarily store the detection data. The detection data stored in the storage unit is overwritten and updated every time the detection unit 104 acquires new detection data.

On the basis of information included in the detection data stored in the storage unit (i.e., identification information for identifying the preferential communication and information indicating the elapsed time from the start of preferential communication), the priority determination unit 101 determines that communication in which a time from the start of preferential communication within connected preferential communication exceeds a predetermined time is not a priority determination target (i.e., causes the preferential communication to be terminated). Thereby, the communication control device 10 can perform preferential control so that communication in which a time from the start of preferential communication within preferential communication during a communication connection in the EPC 20 exceeds the predetermined time is not a priority determination target.

Also, for example, the communication control device 10 may transmit data indicating that the communication to be performed by the terminal is preferential communication and data indicating the remaining time until the end of the preferential communication and the like to the terminal (e.g., the terminal 70 and the terminal 71) that performs communication. Then, the terminal may be configured to display information based on the data on a display screen (e.g., a liquid crystal display) or the like of its own terminal.

Also, although an example in which the priority determination unit 101 performs preferential control on the basis of information indicating the elapsed time from the start of preferential communication and the like has been described above, the present invention is not limited thereto: For example, the PCRF 202 (the preferential control unit) may be configured to control the P-GW 200 so that the elapsed time from the start of each preferential communication is monitored and preferential communication is terminated with respect to communication in which an elapsed time from the start of preferential communication within connected preferential communication exceeds the predetermined time. Thereby, the PCRF 202 (the preferential control unit) can perform preferential control on the basis of the elapsed time from the start of preferential communication. For example, the PCRF 202 (the preferential control unit) can perform preferential control so that the elapsed time of preferential communication in the EPC 20 is monitored and a communication bandwidth or an amount of time slot allocation for other preferential communication is made greater by setting specific preferential communication that is not a preferential connection target (terminating the preferential communication) if an elapsed time of the specific preferential communication is longer than an elapsed time of the other preferential communication.

(Preferential Control Example 5)

In the present example, the priority determination unit 101 of the communication control device 10 includes, for example, a storage unit (not illustrated) configured to store non-target communication identification information for identifying communication that is not a priority determination target as in specific communication described in the above-described preferential control example 4 (i.e., in which preferential communication is terminated) during a fixed period (e.g., one hour for which the communication is not a priority determination target). Also, the information may be identification information associated with the communication itself, terminal identification information for identifying a terminal that performs the communication, or CP server identification information for identifying a CP server that performs the communication.

When the communication data is acquired from the EPC 20 via the acquisition unit 100, the priority determination unit 101 collates the identification information for identifying the communication included in the communication data with the non-target communication identification information stored in the storage unit. If identification information matching the identification information for identifying the communication included in the communication data is present in the non-target communication identification information, the priority determination unit 101 determines that the communication indicated by the communication data is not a priority determination target (i.e., causes preferential communication not to be performed).

Thereby, the communication control device 10 can perform preferential control so that communication changed from preferential communication to non-preferential communication is not changed back to preferential communication during a predetermined period.

Also, although the priority determination unit 101 performs the determination for the preferential control so that communication changed from preferential communication to non-preferential communication is not changed back to preferential communication during the predetermined period in the present example, the present invention is not limited thereto. For example, when the PCRF 202 (the preferential control unit) may be configured to include a storage unit (not illustrated) configured to store non-target communication identification information for identifying communication changed from preferential communication to non-preferential communication (which is not a priority determination target) during a fixed period (e.g., one hour for which the communication is not a priority determination target). Thereby, the PCRF 202 (the preferential control unit) can perform preferential control so that communication changed from preferential communication to non-preferential com- Second Embodiment Hereinafter, a second embodiment of the present invention will be described with reference to the drawings.

First, an outline of a privilege service related to communication, which is implemented by a communication system according to the second embodiment, will be described with reference to FIG. 5.

Also, because a configuration of the communication system according to the second embodiment is similar to that of the communication system according to the first embodiment described with reference to FIG. 1, description thereof will be omitted.

[Outline of Privilege Service Related to Communication]

Figure 5:
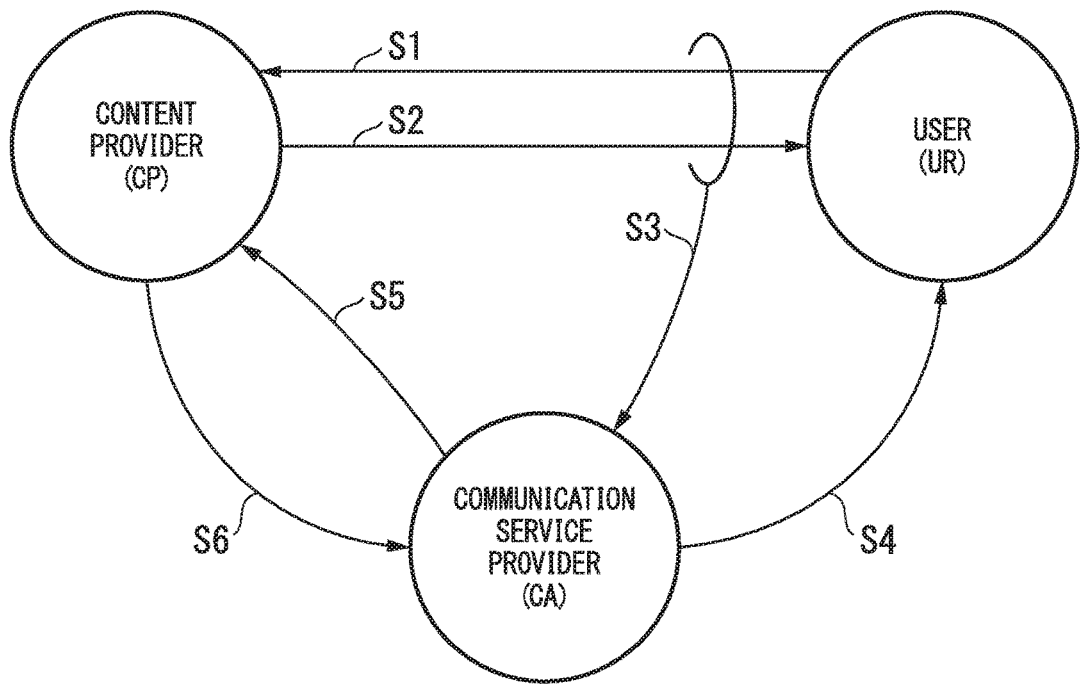
FIG. 5 is a diagram illustrating an example of an outline of a privilege service related to communication in a communication system according to a second embodiment of the present invention.

FIG. 5 is a diagram illustrating an example of an outline of a privilege service related to communication in the communication system according to the second embodiment of the present invention. This privilege service is a service provided between a communication service provider CA, a content provider CP, and a user UR (a user).

In the present example, the content provider CP is a video distribution service provider and provides a video through a communication system provided by the communication service provider CA. The user UR purchases moving image content which is a product from the content provider CP via the communication system provided by the communication service provider CA. A flow of the privilege service in the present example will be described.

The user UR requests the content provider CP to provide a service (step S1). Specifically, the user UR places an order for distribution of moving image content to the content provider CP via a web page provided by the content provider CP.

The content provider CP provides a service to the user UR (step S2). Specifically, the content provider CP provides the user UR with the moving image content corresponding to the order from the user UR via communication provided by the communication service provider CA.

The communication service provider CA acquires communication information from between the user UR and the content provider CP for a service provision request and content provision (step S3). The communication information includes terminal identification information for identifying a terminal used by the user UR, application identification information for identifying an application used by the user UR, access destination information indicating a communication access destination, communication quality information indicating a situation of communication quality, and the like.

When such communication information satisfies a predetermined condition (granting condition), the communication service provider CA provides a privilege to the user UR (step S4). That is, when communication with the content provider CP is performed, the user UR receives a privilege from the communication service provider CA if the communication satisfies a predetermined condition. The privileges include free of charge for a communication fee, a discount for a communication fee, free provision of a number of communication packets (an amount of data), provision of a discount for a number of communication packets (an amount of data), provision of preferential communication (preferential allocation of a communication frequency), and the like. Also, the granting condition includes a condition for determining whether or not to grant a privilege and a condition for determining details of the privilege or a degree of privilege. On the basis of details of the communication information, the communication service provider CA determines whether or not to grant the privilege, details of the privilege, and a degree of privilege when the privilege is granted. That is, the communication service provider CA provides the user UR with details of a privilege and a degree according to details of the communication information.

The communication service provider CA requests the content provider CP to pay the cost of the privilege provided to the user UR (step S5). In response to the request from the communication service provider CA, the content provider CP pays the cost of the privilege to the communication service provider CA (step S6).

That is, according to this privilege service, the content provider CP can provide the privilege to the user UR via the communication service provider CA. Therefore, according to this privilege service, it is possible to motivate the user UR to send a service provision request to the content provider CP. That is, according to this privilege service, it is possible to give the user UR a motivation to communicate with the content provider CP.

[Configuration of Charging Server]

Next, a functional configuration of the charging server according to the second embodiment will be described with reference to the drawings. In order to distinguish the charging server from the charging server 90 according to the first embodiment, the charging server according to the second embodiment will be referred to as a charging server 90R hereinafter.

Figure 6:
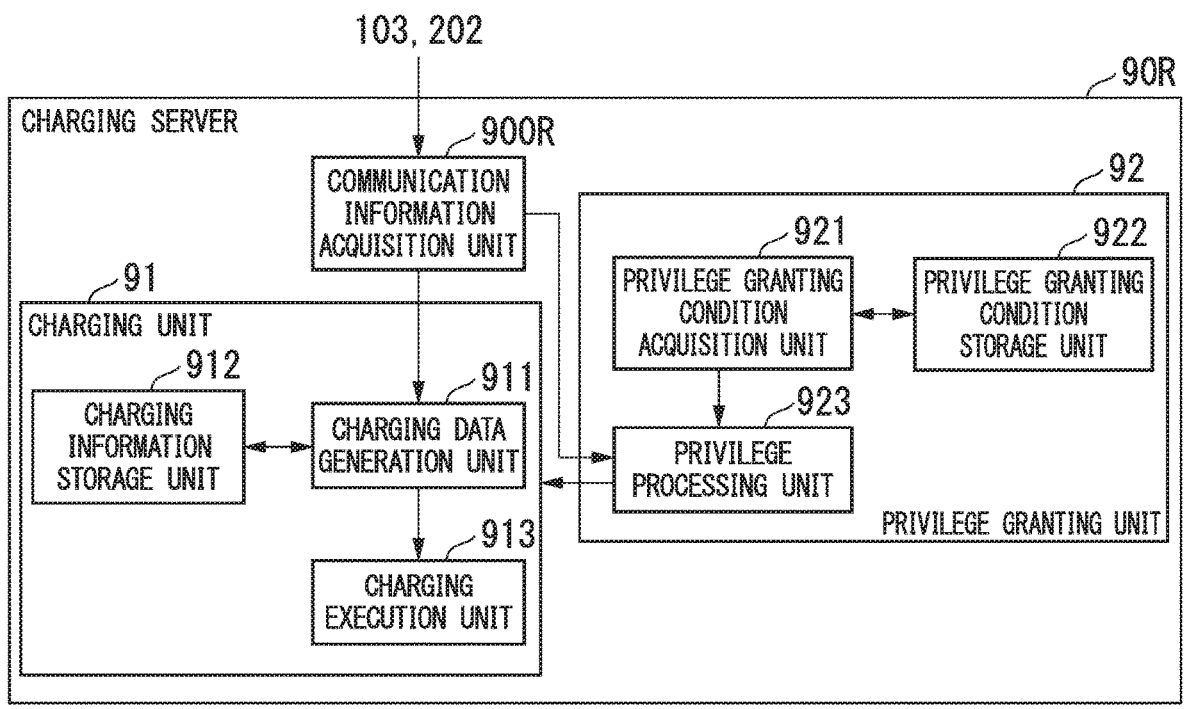
FIG. 6 is a block diagram illustrating a functional configuration of a charging server in a communication system according to the second embodiment of the present invention.

FIG. 6 is a block diagram illustrating the functional configuration of the charging server in the communication system according to the second embodiment of the present invention.

The charging server 90R includes a communication information acquisition unit 900R, a charging unit 91, and a privilege granting unit 92. The charging unit 91 is configured to include a charging data generation unit 911, a charging information storage unit 912, and a charging execution unit 913. The privilege granting unit 92 includes a privilege granting condition acquisition unit 921, a privilege granting condition storage unit 922, and a privilege processing unit 923.

The communication information acquisition unit 900R acquires terminal identification information, information for identifying a communication destination device (e.g., the CP server 30-1, the CP server 30-2, or the CP server 31) of communication to be performed by a device identified by the terminal identification information (e.g., application identification information for identifying an application used by the user UR), access destination information indicating an access destination of communication, and communication quality information indicating a situation of communication quality from the transmission unit 103 of the communication control device 10 or the PCRF 202 of the EPC 20. The communication information acquisition unit 900R outputs the information to the charging data generation unit 911.

The charging data generation unit 911 determines a charging destination and generates charging data on the basis of at least one of pieces of the terminal identification information, the application identification information, the access destination information, and the communication quality information acquired from the communication information acquisition unit 900R and various types of information stored in the charging information storage unit 912. For example, the charging data includes information indicating the charging destination and information indicating a communication fee on the basis of the communication destination identification information.

For example, various types of information stored in the charging information storage unit 912 is information indicating a table in which terminal identification information, communication destination identification information, preferential control related information or communication related information and charging information (e.g., a charging method, a communication fee, and the like) are associated, information indicating the charging destination, and the like.

That is, the charging data generation unit 911 generates the charging data on the basis of the information acquired from the communication information acquisition unit 900R and the information stored in the charging information storage unit 912.

The charge information storage unit 912 is configured to include a storage medium, for example, an HDD, a flash memory, an EEPROM, a ROM, a RAM, or any combination thereof.

The charging execution unit 913 performs a charging process for the charging destination on the basis of the charging data input from the charging data generation unit 911.

The privilege granting condition acquisition unit 921 acquires a condition for granting a privilege for communication from the privilege granting condition storage unit 922.

The privilege granting condition storage unit 922 stores various types of information used for determining the privilege granting condition. For example, the various types of information is privilege target terminal information, privilege target application information, privilege target access destination information, privilege target transaction information, privilege target time period information, privilege target communication quality information, and the like.

Here, the privilege target transaction information is information transmitted from a transaction partner when the user UR makes a transaction with a content provider CP, an electronic commerce (EC) site, or the like serving as the transaction partner. The privilege target transaction information may include a user ID for identifying the user UR and an amount of money, a date and time, a product name, and the like of a transaction between the user UR and the content provider CP.

The privilege processing unit 923 determines the granting of a privilege for communication on the basis of the communication information acquired by the privilege granting condition acquisition unit 921 and the granting condition acquired by the privilege granting condition acquisition unit 921.

The privilege granted to the user UR by the privilege processing unit 923 includes free of charge or a discount for a communication fee, assignment of a right to use communication, an increase in an amount of data communication available to the user, and the like. When the privilege processing unit 923 grants free of charge or a discount for the communication fee as a privilege, the privilege processing unit 923 outputs details of the privilege to the charging unit 91. The charging unit 91 generates charging data on the basis of a determination result of the privilege processing unit 923. Specifically, the charging unit 91 sets the charging destination from the user UR to the content provider CP with respect to a part or all of charging to the user UR.

Also, if there are a plurality of services under a contract for the user UR, the privilege processing unit 923 may determine a service to which the privilege granted to the user UR is applied. Also, if there are a plurality of services under a contract for the user UR, the privilege processing unit 923 may determine a service to which the privilege is applied on the basis of selection of the user UR. That is, if there are a plurality of services under a contract for the user UR, the user UR may be allowed to select the service to which the privilege is applied.

Next, an example of a determination performed by the privilege processing unit 923 will be described with reference to FIG. 7.

FIG. 7 is a diagram illustrating an example of a privilege granting condition of the charging server in the communication system according to the second embodiment of the present invention.

[Privilege Pattern 1: Granting of Privilege by Use of Specific Application]

The privilege processing unit 923 determines whether or not communication has been performed by a specific application. Specifically, the privilege granting condition storage unit 922 stores privilege target application information. The privilege target application information is information indicating an application that is a target of the privilege among various applications operating in the terminal. In this case, if the user UR communicates with the content provider CP by using the privilege target application, the privilege is granted to the user UR. Here, the privilege target application includes an application provided by the content provider CP. For example, if the content provider CP is a video distribution service provider, the privilege target application includes a video viewing application. Also, for example, if the content provider CP is a mail-order service provider, the privilege target application includes a product selection application.

The charging server 90R can give the user UR a motivation to communicate with the content provider CP by granting a privilege for the use of the application recommended by the content provider CP.

Also, the charging server 90R may use the application recommended by the content provider CP and grant a privilege with respect to the fact that a fee-based transaction has been performed with the content provider CP. According to such a configuration, the charging server 90R can motivate the user UR to communicate with the content provider CP.

[Privilege Pattern 2: Granting of Privilege by Communication Performed with Respect to Specific Uniform Resource Locator (URL)]

The privilege processing unit 923 determines whether or not communication has been performed with respect to a specific URL. Specifically, the privilege granting condition storage unit 922 stores privilege target access destination information. This privilege target access destination information is information indicating an access destination that is a privilege target among various access destinations. In this case, if the user UR accesses the URL provided by the content provider CP, the privilege is granted to the user UR. Here, the URL provided by the content provider CP includes a URL of a homepage or a portal site of the content provider CP. The URL provided by the content provider CP includes URLs of campaigns provided by the content provider CP, banner advertisements, trial use of the content, and the like.

The charging server 90R can give the user UR a motivation to communicate with the content provider CP by granting a privilege to the access to the URL recommended by the content provider CP.

[Privilege Pattern 3: Granting of Privilege According to Transaction Situation]

The privilege processing unit 923 determines a transaction situation between the user UR and the content provider CP. Specifically, the privilege granting condition storage unit 922 stores privilege target transaction information. The privilege target transaction information is information indicating a transaction situation in which a privilege is granted among transaction situations between the user UR and the content provider CP. The transaction situation includes a user ID for identifying the user UR, the presence or absence of a transaction between the user UR and the content provider CP, the number of transactions, a transaction frequency, a date and time, a product name, and the like. For example, the privilege processing unit 923 may grant a privilege when the number of accesses to the content provider CP is greater than or equal to the predetermined number of times. Also, the privilege processing unit 923 may grant a privilege even if there has been a transaction once in the past within a month in which communication is performed. If the presence or absence of a transaction is a granting condition of a privilege, the privilege processing unit 923 determines the presence or absence of a transaction between the user UR and the content provider CP. The privilege processing unit 923 grants a privilege to the user UR if there is a transaction between the user UR and the content provider CP or if there is no transaction between the user UR and the content provider CP. There is a "repeater privilege" as an example in which a privilege is granted when there is a transaction. Also, there is a "new customer privilege" as an example in which a privilege is granted in the absence of a transaction.

Also, the transaction situation between the user UR and the content provider CP includes a situation of a process of registering a member of the user UR with the content provider CP and a situation of a process of purchasing a product or the like. For example, the privilege processing unit 923 may grant a privilege when the user UR has performed new member registration for the content provider CP.

Also, although the charging server 90R will be described as acquiring the transaction situation between the user UR and the content provider CP by receiving communication details exchanged between the user UR and the content provider CP, the present invention is not limited thereto. For example, the content provider CP may have a database (not illustrated) for storing a transaction situation between the user UR and the content provider CP. In this case, the charging server 90R may acquire the transaction situation between the user UR and the content provider CP from the database of the content provider CP.

Modified Example: Granting Value of Privilege According to Transaction Situation Even when the user UR does not purchase a product or the like, the privilege processing unit 923 may grant a privilege. Specifically, the privilege processing unit 923 grants a privilege in a state in which the user UR has applied for purchase of a product or the like and a state in which the user UR has not paid a fee. Also, the privilege processing unit 923 grants a privilege when the user UR cancels the purchase application after applying for the purchase of a product or the like. In this case, the privilege processing unit 923 may grant a lower value privilege than when the user UR purchases a product or the like. That is, the privilege processing unit 923 may grant a low value privilege at the stage before purchasing of a product or the like and grant a high value privilege at the stage after purchasing of a product or the like.

Also, the privilege processing unit 923 may determine details of the privilege to be granted on the basis of a purchase history of products or the like and the cumulative number of transactions of the user UR. Specifically, when the cumulative number of transactions of the user UR is large, the privilege processing unit 923 grants a higher value privilege to the user UR.

Also, if the user UR is performing member registration for the content provider CP, the privilege processing unit 923 may grant a privilege of a value corresponding to a member rank.

The charging server 90R can give the user UR a motivation to communicate with the content provider CP by granting a privilege for the access to the URL recommended by the content provider CP.

[Privilege Pattern 4: Granting of Privilege According to Time Period of Communication]

The privilege processing unit 923 determines a time period during which the communication between the user UR and the content provider CP is performed. Specifically, the privilege granting condition storage unit 922 stores privilege target time period information. The privilege target time period information is information indicating a time period for which a privilege is granted among time periods during which communication between the user UR and the content provider CP is performed. The privilege processing unit 923 makes a determination by comparing the time period of the communication between the user UR and the content provider CP with the privilege target time period information. When the time period of the communication between the user UR and the content provider CP is the time period of the privilege target, the privilege processing unit 923 grants a privilege to the user UR. As a time period during which a privilege is granted, for example, a time period with a small amount of communication such as late at night or early morning is selected. The charging server 90R can promote the use of the time period during which the amount of communication is small to uniformize the amount of communication during the day.

Also, the privilege processing unit 923 may determine granting of a privilege by combining a time period during which communication between the user UR and the content provider CP is performed and an amount of communication (the number of packets). In this case, the privilege processing unit 923 grants the privilege to this user UR when a predetermined amount of communication or more is performed in a predetermined time period between the user UR and the content provider CP. According to such a configuration, the charging server 90R distinguishes, for example, a user UR who performs a small amount of communication for a privilege and a user UR who performs communication of content using many packets to grant the privilege. Therefore, the charging server 90R can prompt the user UR to perform more communication in a predetermined time period.

[Privilege Pattern 5: Granting of Privilege According to Communication Quality]

The privilege processing unit 923 determines quality of communication between the user UR and the content provider CP. Specifically, the privilege granting condition storage unit 922 stores privilege target communication quality information. The privilege target communication quality information is information indicating a quality standard of communication performed between the user UR and the content provider CP. The privilege processing unit 923 makes a determination by comparing the quality of communication between the user UR and the content provider CP with the privilege target communication quality information. If the quality of communication between the user UR and the content provider CP satisfies or does not satisfy the quality standard of the privilege target, the privilege processing unit 923 grants a privilege to the user UR. The communication quality standard for which a privilege is granted includes a degree of communication congestion, a degree of packet loss, the presence/absence of communication failure, and the like. For example, as a quality standard of communication for which a privilege is granted, a situation in which communication is more congested is selected. In this case, the charging server 90R grants a privilege when the communication is congested and the quality of the content provided by the content provider CP is degraded. Also, the privilege processing unit 923 may grant a privilege by changing details of the privilege according to the degree of deterioration of the communication quality. For example, the privilege processing unit 923 grants more privileges to the user UR when a degree of packet loss is higher. The charging server 90R can reduce dissatisfaction of the user UR by granting a privilege as compensation for deterioration of the quality of content.

Modified Examples

A notification is provided to a user terminal having a communication connection on the basis of the detection data of the communication device acquired by the detection unit of the communication control device 10. For example, the notification is displaying of a screen for confirming a user's intention for decreasing communication quality (a throughput or the like) on an application on the user terminal. The communication control device transmits control information to the communication device and performs control of the communication quality (QoS or the like) to the user terminal having accepted the decrease of the communication quality. The charging server determines confirmation as a privilege granting condition and grants a privilege to the user. An upper limit value may be set for the number of users to whom the privilege is granted.

[Privilege Pattern 6: Granting of Privilege for Communication by Specific Terminal]

The privilege processing unit 923 determines whether or not communication has been performed by a specific terminal. Specifically, the privilege granting condition storage unit 922 stores privilege target terminal information. The privilege target terminal information is information indicating a terminal that is a privilege target among various terminals. For example, the privilege target terminal information includes information indicating a model of the privilege target among various models of terminals.

In this case, if the user UR performs communication using a model (e.g., a new model) recommended by the communication service provider CA, a privilege is granted to the user UR. In this case, the burden of the cost of the privilege may be imposed on the communication service provider CA instead of the content provider CP.

Also, the charging server 90R can also combine the above-described privilege patterns to grant a privilege.

Modified Example: Granting of Privilege with Validity Period

The charging server 90R may grant a privilege with a validity period to the user UR. Specifically, if the charging server 90R gives the user UR the right to use communication as a privilege, the charging server 90R may determine a validity period for the right of use. In this case, for example, the charging server 90R sets a validity period by setting a timing at which the right to use communication is granted as the start of the validity period. Also, the charging server 90R may determine the validity period by setting an initial use timing of the right to use communication at the start of the validity period.

Also, in this case, the charging server 90R may also perform privilege processing by changing the validity period for use of the privilege on the basis of the communication information acquired by the privilege granting condition acquisition unit 921. Specifically, if a predetermined condition is satisfied, the charging server 90R extends the validity period for use of the right to use communication. The predetermined condition includes, for example, a case in which the user UR accesses a banner advertisement or the like of the content provider CP, a case where the user UR uses a predetermined application, and the like.

According to such a configuration also, the charging server 90R can motivate the user UR to communicate with the content provider CP.

Modified Example: Granting of Privilege with Limited Usable Range

The charging server 90R may grant a privilege of which a usable range is limited to the user UR. Specifically, if the charging server 90R gives the user UR the right to use communication as a privilege, the charging server 90R may determine the usable range for the right to use. The usable range includes, for example, a specific application or a specific URL. That is, the charging server 90R may give the user UR a specific application or a privilege capable of being used only for a specific URL or the like.

[Privilege Pattern 7: Granting of Privilege Based on Amount of Communication]

If the terminal is used for the Internet of things (IoT), for example, if the terminal is used for monitoring a water level of a river, the following usage forms are conceivable. That is, the terminal transmits current water level data to a specific connection destination in normal times, and transmits a moving image of a surrounding situation photographed by a surveillance camera in the case of an emergency such as increased water. In such a usage form, an amount of data transmitted in an emergency situation is extremely large as compared with an amount of data transmitted in normal times. In this usage form, a priority of communication becomes low in normal times and the priority of communication becomes high in an emergency. Thus, in the case of this usage form, a contract in which communication with a low priority is performed in normal times and communication with a high priority is performed in the emergency is made. Contracts for performing communication with a high priority may be expensive. Thus, if a communication service contract is made in accordance with an amount of communication and a priority in an emergency which occurs only for a short period of time, there is a problem in that it is difficult to eliminate a sense of expensiveness for the user UR with respect to communication in normal times.

Therefore, when the use of data communication matches a specific condition, the charging server 90R reduces a burden of a communication fee on the user UR. An example of a mechanism for reducing the burden of the communication fee on the user UR performed by the charging server 90R will be described with reference to FIG. 8.

Figure 8:
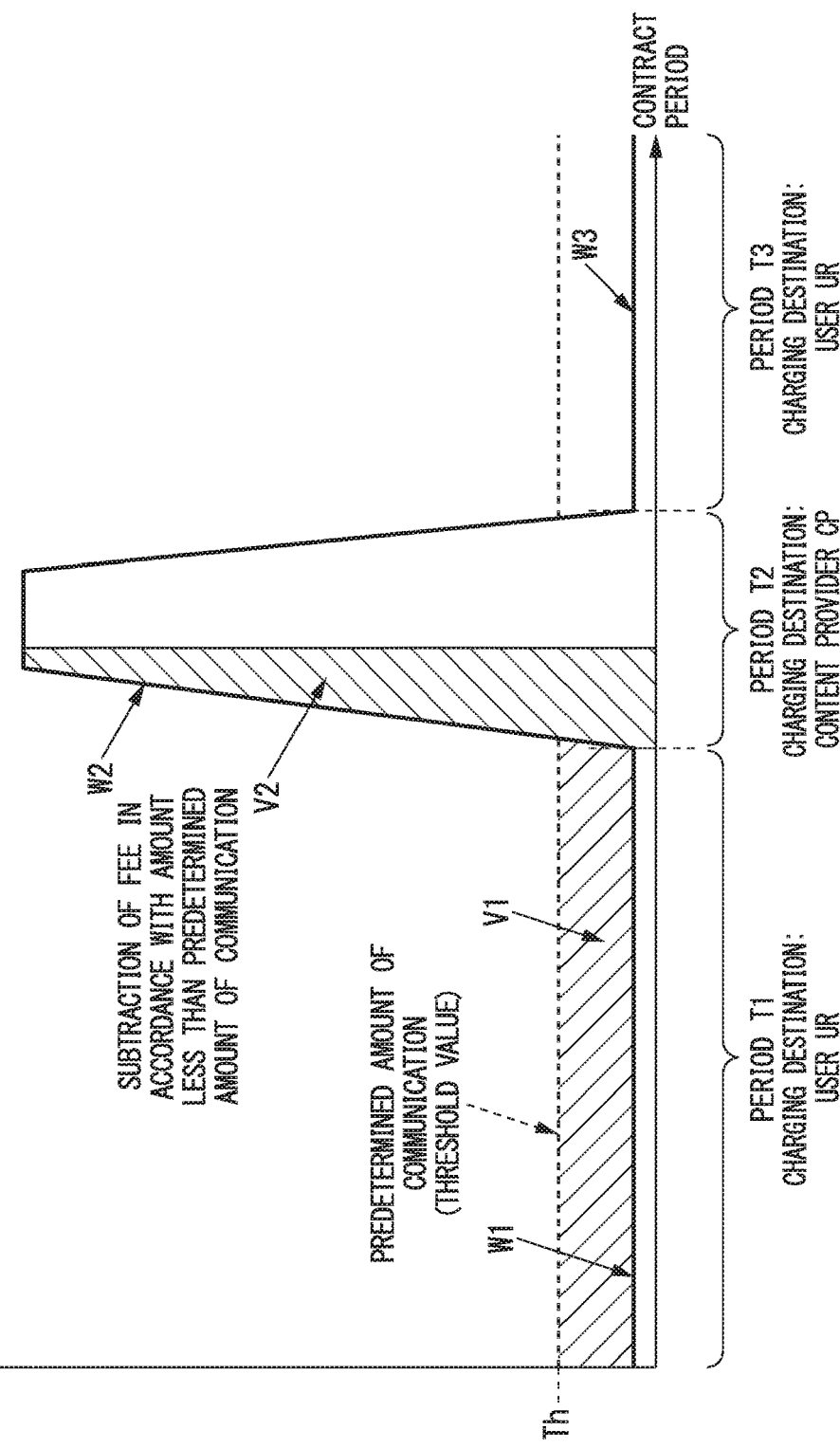
FIG. 8 is a diagram illustrating an example in which the charging server reduces a burden on a user UR in the communication system according to the second embodiment of the present invention.

FIG. 8 is a diagram illustrating an example in which the charging server reduces a burden on the user UR in the communication system according to the second embodiment of the present invention. Waveforms W1 to W3 in FIG. 8 indicate the transition of the amount of data communication with respect to a contract period of a terminal of a certain user UR. Here, the waveform W1 indicates an amount of data communication during a period T1. In the example of the above-described water level monitoring, the period T1 is a period during which the river maintains a normal water level and water level data is transmitted. During this period T1, the amount of data communication by the user UR is less than or equal to a predetermined threshold value Th. The predetermined threshold value Th is a usage threshold value of an amount of data communication defined in the contract between the user UR and the communication service provider CA.

Also, the waveform W2 in FIG. 8 indicates an amount of data communication during a period T2. This period T2 is a period during which there is more water in the river and moving image data is transmitted in the above-described example of the water level monitoring. During this period T2, the amount of data communication by the user UR exceeds the predetermined threshold value Th.

The waveform W3 indicates an amount of data communication during a period T3. This period T3 is a period during which the river maintains a normal water level in the above-described example of the water level monitoring. During this period T3, the amount of data communication by the user UR is less than or equal to the predetermined threshold value Th.

In the contract between the user UR and the communication service provider CA, when the amount of data communication exceeds the threshold value Th, an upper limit value of a communication rate decreases or a priority of communication decreases as compared with when it does not exceed the threshold value Th. That is, in this contract, when the amount of data communication exceeds the threshold value Th, a disadvantage occurs for the user UR. Thus, there is a motivation for the user UR to perform communication such that the amount of data communication does not exceed the threshold value Th in normal times. As indicated by the waveform W1, if the amount of data communication is less than or equal to the predetermined threshold value Th, an unused amount V1 occurs. The user UR can cause another user UR who wishes to preferentially use a communication line to use this unused amount V1. That is, it is possible to flexibly use a bandwidth of the communication line between the users UR.

During the period T2, because a moving image is transmitted, an amount of data communication is larger than in normal times. In this case, during the period T2, the user UR uses an unused region of another user UR and preferentially uses the communication line. The amount of data communication during the period T2 exceeds the predetermined threshold value Th.

The charging server 90R sets a charging destination of a data communication fee to the user UR with respect to the period T1 and the period T3 and sets the charging destination to the content provider CP with respect to the period T2. That is, the charging server 90R changes the charging destination of the data communication fee during the period T2 from the user UR to the content provider CP. The charging server 90R alleviates the burden on the user UR by changing the charging destination of the data communication fee. According to the charging server 90R, if a communication service contract is made in accordance with the amount of communication and the priority in an emergency that occurs only for a short period of time, it is possible to eliminate a sense of expensiveness for the user UR with respect to communication in normal times.

Also, the charging server 90R may subtract a fee for an amount of data communication V2 corresponding to the unused amount V1 from the data communication fee during the period T2. According to the above-described configuration, the charging server 90R can reduce a cost burden on the user UR by changing the charging destination of the data communication fee.

Application Example: Restaurant Reservation System

An application example of the charging server 90R of the present embodiment will be described. In this application example, the above-described content provider CP is a business service provider of a restaurant and the user UR is a customer who makes a reservation for a restaurant.

The user UR inputs reservation information such as a restaurant name, the number of reserved people, a reservation time, and the like to a terminal. The terminal accesses the content provider CP and transmits the reservation information. The content provider CP performs a reservation process on the restaurant and transmits a reservation result to the terminal. In this case, the content provider CP may notify the user UR of the availability of the restaurant. The charging server 90R acquires a communication situation between this user UR and the content provider CP. If it is determined that the user UR and the content provider CP are performing communication for the restaurant reservation, the charging server 90R switches the charging destination of this communication from the user UR to the content provider CP.

According to such a configuration, the charging server 90R can reduce a cost burden on the user UR, so that it is possible to give the user UR a motivation to access the content provider CP.

Also, the charging server 90R of the present embodiment can also be applied to, for example, an ordering (menu order) system for food and beverages in a restaurant. The content provider CP displays menu screens of food and beverages for the terminal of the user UR in the restaurant. The user UR places orders for food and beverages by operating his/her terminal. In response to the order from the user UR, the content provider CP provides food and beverages to the user UR. The charging server 90R acquires a communication situation between this user UR and the content provider CP. If it is determined that the user UR and the content provider CP are performing communication for order placement, the charging server 90R switches the charging destination of this communication from the user UR to the content provider CP. Also, if it is determined that the user UR and the content provider CP are performing communication for order placement, the charging server 90R may grant a privilege such as a coupon usable in the restaurant to the user UR.

As described above, the communication system 1 according to the present embodiment can flexibly perform preferential communication in various situations.

Although the communication system 1 according to the present embodiment is a system configured to control a communication network including wireless communication via the radio access network 60, the present invention is not limited thereto. The communication system 1 according to the present embodiment may be, for example, a system configured to control a communication network via a wired access network.

While embodiments of the present invention and modifications thereof have been described, these embodiments and modifications thereof have been presented by way of example only, and are not intended to limit the scope of the invention. The novel embodiments described herein may be embodied in a variety of other forms, and various omissions, substitutions, and changes may be made without departing from the spirit of the invention. These embodiments and modifications thereof are included in the scope and spirit of the invention, and also included in the invention described in the scope of claims and the scope of equivalents thereof.

Also, a computer is provided in the above-described devices. Processes of various types of processing of the above-described devices are stored in a computer-readable recording medium in the form of the program, and various types of processing described above are performed by the computer reading and executing this program. Here, the computer-readable recording medium refers to a magnetic disk, a magneto-optical disc, a CD-ROM, a DVD-ROM, a semiconductor memory, or the like. Also, a computer program may be distributed to a computer through a communication line, and the computer receiving the distributed computer program may execute the program.

Also, the above-described program may be a program for implementing some of the above-described functions.

Further, the above-described program may be a program capable of implementing the above-described functions in combination with a program already recorded on the computer system, i.e., a so-called differential file (differential program).

REFERENCE SIGNS LIST

1 Communication system
10 Communication control device (information processing device)
20 EPC
30-1 CP server (preferential)
30-2 CP server (preferential)
31 CP server (general)
40 Closed area network
50 Internet
60 Radio access network
70 Terminal (preferential)
71 Terminal (general)
80 HSS
90 Charging server
90R Charging server
91 Charging unit
92 Privilege granting unit
100 Acquisition unit
101 Priority determination unit
102 Preferential control information generation unit
103 Transmission unit
104 Detection unit
200 P-GW
201 S-GW
202 PCRF (preferential control unit)
203 MME
600 eNodeB
900 Acquisition unit
900R Communication information acquisition unit
901 Charging data generation unit
902 Storage unit
903 Charging execution unit
911 Charging data generation unit
912 Charging information storage unit
913 Charging execution unit
921 Privilege granting condition acquisition unit
922 Privilege granting condition storage unit
923 Privilege processing unit

The invention claimed is:

1. An information processing device comprising:
a processor; and
a memory that stores an instruction, the device further comprising, as a configuration when the processor executes the instruction stored in the memory:
an acquirer configured to acquire communication data;
a priority determiner configured to determine a priority for identifying a priority ranking in communication bandwidth allocation on the basis of the communication data;
a preferential control information generator configured to generate preferential control information on the basis of a determination result of the priority determiner; and
a transmitter configured to transmit device identification information for identifying a device which performs communication and the preferential control information to a communication device which relays the communication.

2. The information processing device according to claim 1, comprising:
a detector configured to detect a communication situation in the communication device,
wherein, if a communication connection request indicated by the communication data satisfies a predetermined first condition, the priority determiner determines the priority for identifying the priority ranking in the communication bandwidth allocation on the basis of the communication data, and
wherein, if the communication situation satisfies a predetermined second condition, the transmitter transmits priority change information indicating a change from the priority to a different priority or preferential disconnection information indicating a disconnection of a preferential connection to the communication device.

3. The information processing device according to claim 1,
wherein, if a communication connection request indicated by the communication data satisfies a predetermined first condition, the priority determiner determines the priority for identifying the priority ranking in the communication bandwidth allocation on the basis of the communication data, and
wherein, if a predetermined second condition is satisfied, the transmitter transmits information indicating the device identification information, communication destination identification information for identifying a device of a communication destination of the communication performed by a device identified by the device identification information, preferential control related information which is information related to preferential control to be performed for the communication on the basis of the preferential control information, and communication related information which is information related to the communication to a charging device configured to perform a charging process on the basis of the information.

4. The information processing device according to claim 1, wherein the communication data includes information for requesting a preferential connection and priority information indicating the priority ranking in the communication bandwidth allocation or the priority.

5. The information processing device according to claim 4, wherein the priority information indicates the priority ranking or the priority with respect to a communication connection source in the communication or a communication connection destination in the communication.

6. The information processing device according to claim 1, wherein the communication data is data transmitted by a device of a request source or a request destination of the communication.

7. The information processing device according to claim 1, wherein the communication data is information to be transmitted on the basis of an operation input in the device.

8. The information processing device according to claim 1, wherein the communication data includes identification information for identifying an application, identification information for identifying a communication connection destination, or information indicating a configuration of an IP address associated with the communication connection destination.

9. The information processing device according to claim 1, wherein the priority determiner makes a determination on the basis of the fact that the communication data has been transmitted or received in a predetermined time period, that the communication data has been transmitted from a device located in a predetermined place, or that the communication data is a predetermined type of communication data.

10. The information processing device according to claim 1, comprising:
a detector configured to detect a communication situation of the communication,
wherein the priority determiner determines whether or not to perform preferential control on the basis of the communication situation.

11. The information processing device according to claim 1, wherein, if the number of devices connected to the communication device in a first priority exceeds a predetermined number or if a proportion of the communication bandwidth in use exceeds a predetermined proportion, the priority of any one of the devices connected to the communication device that is the device meeting a predetermined condition is changed to a second priority different from the first priority.

12. The information processing device according to claim 1, wherein the priority determiner starts a determination of the priority on the basis of communication data indicating a start request of communication in the priority.

13. The information processing device according to claim 2,
wherein the detector detects the communication situation in one or more communication devices, and
wherein the transmitter performs transmission to one or more communication devices.

14. The information processing device according to claim 2, wherein the predetermined second condition is that a usage proportion of the communication bandwidth in the communication device in which the communication is performed exceeds a predetermined threshold value.

15. The information processing device according to claim 2, wherein the predetermined second condition is that the number of simultaneous connections in the communication exceeds a predetermined threshold value.

16. The information processing device according to claim 2, wherein the predetermined second condition is that the communication is communication in a predetermined time period or that a communication area of the communication device is a predetermined communication area.

17. The information processing device according to claim 2, wherein the predetermined second condition is that an average throughput of the device connected to the communication device in which the communication is performed is less than a predetermined threshold value.

18. The information processing device according to claim 3, wherein the communication related information is information indicating at least one of a communication start clock time, a communication end clock time, information indicating a position where communication has occurred, the number of communication packets, an amount of communication data, a throughput, and a communication time.

19. The information processing device according to claim 3, wherein the preferential control related information is information indicating at least one of pieces of information indicating whether or not the preferential control has been performed and the number of communication packets, an amount of communication data, a throughput, and a communication time according to communication based on the preferential control.

20. An information processing method using a computer, the information processing method comprising:
acquiring, via an acquisition unit, communication data;
determining, via a priority determination unit a priority for identifying a priority ranking in communication bandwidth allocation on the basis of the communication data;
generating, via a preferential control information generation unit, preferential control information on the basis of a determination result of the priority determination unit; and
transmitting, via a transmission unit, device identification information for identifying a device which performs communication and the preferential control information to a communication device which relays the communication.

21. A non-transitory computer-readable recoding medium having a computer program for causing a computer to execute processes comprising:
acquiring communication data;
determining a priority for identifying a priority ranking in communication bandwidth allocation on the basis of the communication data;
generating preferential control information on the basis of a determination result in the determining a priority; and
transmitting device identification information for identifying a device which performs communication and the preferential control information to a communication device which relays the communication.

* * * * *

UNITED STATES PATENT AND TRADEMARK OFFICE
CERTIFICATE OF CORRECTION

PATENT NO. : 10,667,279 B2
APPLICATION NO. : 15/754868
DATED : May 26, 2020
INVENTOR(S) : T. Niina Page 1 of 1

It is certified that error appears in the above-identified patent and that said Letters Patent is hereby corrected as shown below:

On the Title Page

Item (73), Assignee, please change "KIDDI" to -- KDDI --.
Item (56), page 2/other publications (Line 11), please change "dated Mar. 5, 2019, dated 2016-010752" to -- 2016-010752, dated Mar. 5, 2019 --.
Item (56), page 2/other publications (Line 14), please change "dated Mar. 5, 2019, dated 2016-006393" to -- 2016-006393, dated Mar. 5, 2019 --.
Item (56), page 2/other publications (Line 17), please change "dated Mar. 5, 2019, dated 2016-256930" to -- 2016-256930, dated Mar. 5, 2019 --.

In the Claims

At Column 40, Line 35 (Claim 20, Line 4), please change "unit" to -- unit, --.

Signed and Sealed this
First Day of December, 2020

Andrei Iancu
*Director of the United States Patent and Trademark Office*